US008786420B2

(12) United States Patent
Marumoto

(10) Patent No.: US 8,786,420 B2
(45) Date of Patent: Jul. 22, 2014

(54) DRIVE RECORDER

(75) Inventor: Kyoji Marumoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 290 days.

(21) Appl. No.: 13/089,523

(22) Filed: Apr. 19, 2011

(65) Prior Publication Data

US 2011/0254676 A1 Oct. 20, 2011

(30) Foreign Application Priority Data

Apr. 20, 2010 (JP) ................................. 2010-096837

(51) Int. Cl.
*G06F 7/00* (2006.01)
*B60Q 1/00* (2006.01)

(52) U.S. Cl.
USPC .......................... 340/441; 701/32.2; 701/33.4

(58) Field of Classification Search
CPC ................... G07C 5/008; G07C 5/085; B60R 2021/01322; B60R 21/0173; G06Q 10/0833; G08G 1/16; G01C 21/20; G01C 15/00; G01C 21/3617; G01C 21/3697; G01P 1/127; G01P 1/14; G06K 9/00791
USPC ................................ 340/441; 701/32.2, 33.4
See application file for complete search history.

(56) References Cited

U.S. PATENT DOCUMENTS

2007/0173994 A1* 7/2007 Kubo et al. ..................... 701/35
2010/0057302 A1* 3/2010 Foo et al. ........................ 701/45

FOREIGN PATENT DOCUMENTS

JP 2008-052230 3/2008
WO 2007/058357 5/2007

* cited by examiner

*Primary Examiner* — Brian Zimmerman
*Assistant Examiner* — Bhavin M Patel
(74) *Attorney, Agent, or Firm* — Fish & Richardson P.C.

(57) ABSTRACT

A drive recorder of the invention includes a trigger judgment circuit that calculates, with respect to acceleration data of a vehicle, first and second moving averages as moving averages of two different time series, and that generates a trigger signal according to a result of comparing a differential value of the first and second moving averages or an absolute value of the differential value with a predetermined threshold value.

15 Claims, 15 Drawing Sheets

FIG. 6

| DATE& TIME | LOCATION | SPEED [km/h] | ACCELERATION [km/h/s] | ENGINE SPEED [rpm] | |
|---|---|---|---|---|---|
| t0 | P(t0) | V(t0) | A(t0) | R(t0) | : START |
| ⋮ | ⋮ | ⋮ | ⋮ | ⋮ | |
| t1 | P(t1) | V(t1) | A(t1) | R(t1) | |
| ⋮ | ⋮ | ⋮ | ⋮ | ⋮ | |
| t2 | P(t2) | V(t2) | A(t2) | R(t2) | |
| ⋮ | ⋮ | ⋮ | ⋮ | ⋮ | |
| t3 | P(t3) | V(t3) | A(t3) | R(t3) | |
| ⋮ | ⋮ | ⋮ | ⋮ | ⋮ | |
| t4 | P(t4) | V(t4) | A(t4) | R(t4) | : STOP |
| | | | | | |
| t5 | P(t5) | V(t5) | A(t5) | R(t5) | : START |
| ⋮ | ⋮ | ⋮ | ⋮ | ⋮ | |
| t6 | P(t6) | V(t6) | A(t6) | R(t6) | SUDDEN ACCELERATION |
| ⋮ | ⋮ | ⋮ | ⋮ | ⋮ | |
| t7 | P(t7) | V(t7) | A(t7) | R(t7) | |
| ⋮ | ⋮ | ⋮ | ⋮ | ⋮ | |
| t8 | P(t8) | V(t8) | A(t8) | R(t8) | |
| ⋮ | ⋮ | ⋮ | ⋮ | ⋮ | |
| t9 | P(t9) | V(t9) | A(t9) | R(t9) | OVERSPEED |
| ⋮ | ⋮ | ⋮ | ⋮ | ⋮ | |
| t10 | P(t10) | V(t10) | A(t10) | R(t10) | |
| ⋮ | ⋮ | ⋮ | ⋮ | ⋮ | |
| t11 | P(t11) | V(t11) | A(t11) | R(t11) | SUDDEN DECELERATION |
| ⋮ | ⋮ | ⋮ | ⋮ | ⋮ | |
| t12 | P(t12) | V(t12) | A(t12) | R(t12) | |
| ⋮ | ⋮ | ⋮ | ⋮ | ⋮ | |
| t13 | P(t13) | V(t13) | A(t13) | R(t13) | |
| ⋮ | ⋮ | ⋮ | ⋮ | ⋮ | |
| t14 | P(t14) | V(t14) | A(t14) | R(t14) | : STOP |

DRIVE RECORDER

This application is based on Japanese Patent Application No. 2010-96837 filed on Apr. 20, 2010, the contents of which are hereby incorporated by reference.

BACKGROUND OF THE INVENTION

1. Field of the Invention

The present invention relates to a drive recorder that records driving condition data (including image data and traveling data) of a vehicle on the occasion of a traffic accident or dangerous driving, etc.

2. Description of Related Art

In recent years, as means that contributes to reduction of traffic accidents and to analysis of a traffic accident after the occurrence of the traffic accident, a drive recorder is mounted in more and more vehicles. As an example of a conventional technology related to the drive recorder, JP-A-2008-52230 (hereinafter, referred to as Patent Document 1) can be cited.

Various manufacturers have made efforts to develop various technologies related to trigger judgment by the drive recorder (judgment on occurrence of a particular driving behavior in response to which an operation should be performed, for example, to store driving condition data in a nonvolatile manner or to alert a driver). As an example of a conventional technology related to the trigger judgment by the drive recorder, WO 07/058,357 pamphlet (hereinafter, referred to as Patent Document 2) can be cited.

Certainly, the provision of the above-described conventional drive recorder in a vehicle contributes to the reduction of traffic accidents, because a driver, being unwilling to have a traffic accident caused by his or her negligence or his or her dangerous driving recorded in the drive recorder, sticks to safe driving if the conventional drive recorder mentioned above is mounted in the vehicle that he or she drives. Furthermore, if a driver should be involved in a traffic accident despite the fact that he or she deserves no blame for the traffic accident, the driver's innocence can be proved by analyzing, after the occurrence of the traffic accident, the driving condition data recorded in the drive recorder mounted on the vehicle.

In the above-described conventional drive recorder, the trigger judgment is typically performed by sequentially calculating a differential value $X(t)$ ($=G_{max}(t)-G_{min}(t)$) by subtracting the minimum value $G_{min}(t)$ from the maximum value $G_{max}(t)$ of ceaselessly changing vehicle acceleration data $G(t)$ in a unit time (from time $(t-\alpha)$ to time t) or its absolute value $|X(t)|$ and comparing the acquired value with a predetermined threshold value Xth (see FIGS. 11A and 11B).

However, such a trigger judgment algorithm is so sensitive that it responds to an acceleration shift attributable to a road surface condition (e.g. an uneven road surface), and thus a trigger is activated even in driving over a railroad crossing to unnecessarily activate a nonvolatile storage operation of recording the driving condition data or an unnecessary operation of warning the driver. If such erroneous trigger judgment is repeatedly made, leaving the driver uninformed of whether a warning is due to his or her own dangerous driving behavior (e.g. sudden acceleration, sudden steering, sudden breaking) or due to erroneous trigger judgment, the driver eventually becomes accustomed and insensitive to the warnings that are given so often while he or she is driving, and this disadvantageously damages the safe-driving promoting effect that is originally expected from the drive recorder.

Patent Document 2 discloses a driving behavior recording device that includes an erroneous detection reduction processing unit that judges, based on a combination of a wave height and a pulse width of a pulse waveform in data (including acceleration data) of a detected driving behavior, whether the data is particular behavior data or pseudo-behavior data which is erroneously detected as the particular behavior data, and stores the data in a storage medium only when it is judged to be the particular behavior data.

However, with the conventional technology, it is necessary to compare at least one (preferably, more than one) of each of the two parameters of the wave height and the pulse width needs to be compared with a threshold value, and this makes the trigger judgment processing complex, and furthermore, in a case, for example, where a vehicle runs on an uneven road surface to receive vibration while it is being accelerated, the pulse height and the pulse width of the pulse waveform each exceed a predetermined threshold value, which disadvantageously leads to erroneous trigger judgment.

SUMMARY OF THE INVENTION

In view of the above problems discovered by the applicant of the present invention, an object of the present invention is to provide a drive recorder capable of making an appropriate trigger judgment regardless of the road surface state.

To achieve the above object, a drive recorder according to the present invention includes a trigger judgment circuit that calculates, with respect to acceleration data of a vehicle, first and second moving averages as moving averages of two different time series, and that generates a trigger signal according to a result of comparing a differential value or an absolute differential value of the first and second moving averages with a predetermined threshold value.

Other features, elements, steps, advantages and characteristics of the present invention will become more apparent from the following detailed description of preferred embodiments thereof with reference to the attached drawings.

BRIEF DESCRIPTION OF THE DRAWINGS

FIG. 6 is a table showing an example of driving condition data;

DETAILED DESCRIPTION OF PREFERRED EMBODIMENTS (Traffic Information System Using Drive Recorder)

Figure 1:
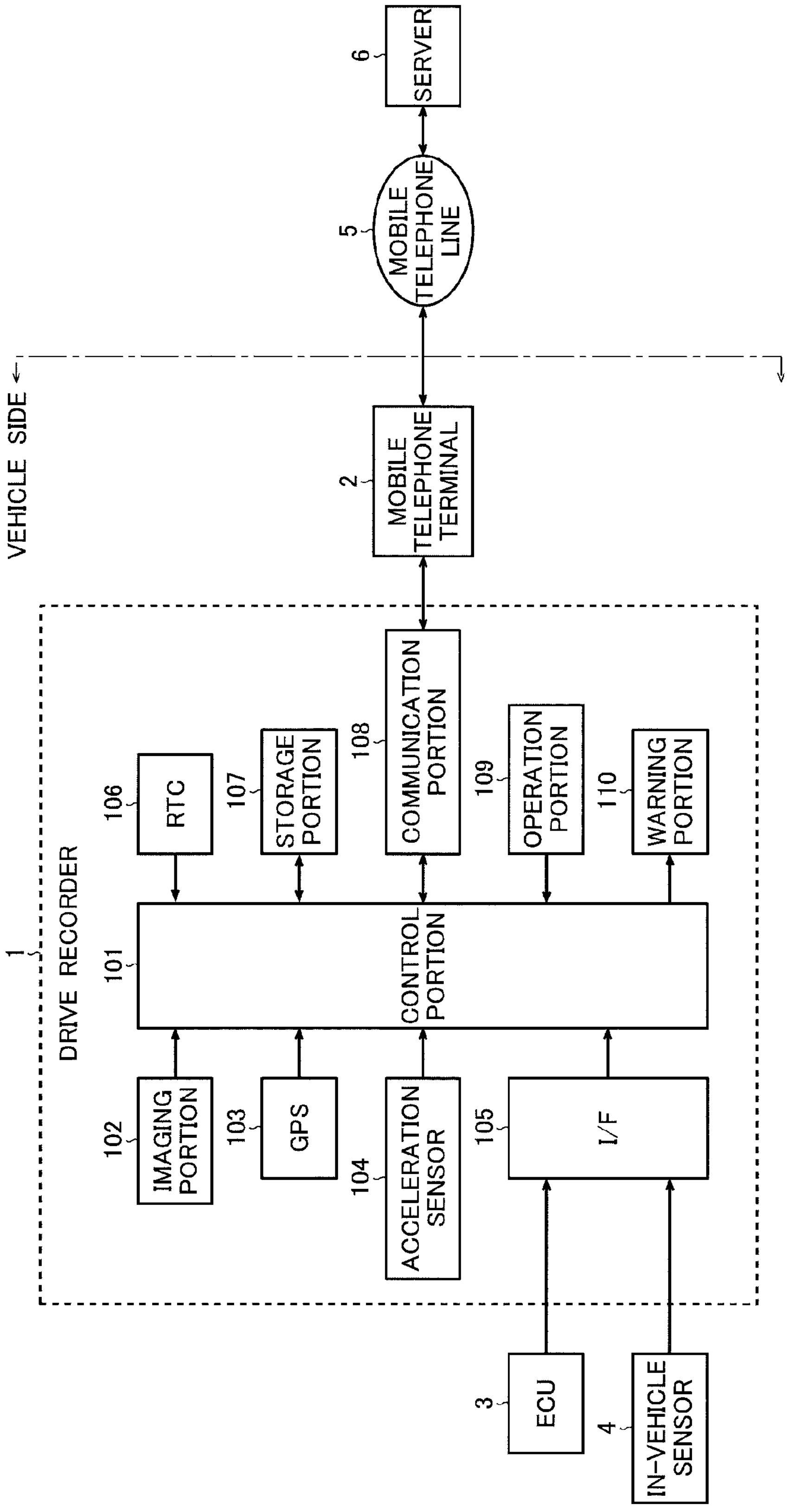
FIG. 1 is a block diagram showing an embodiment of a traffic information system that uses a drive recorder according to the present invention.

FIG. 1 is a block diagram showing an embodiment of a traffic information system that uses a drive recorder according to the present invention.

As shown in FIG. 1, the traffic information system of this embodiment includes: a drive recorder 1; a mobile telephone terminal 2; an electric control unit 3 (hereinafter, referred to as ECU 3), an in-vehicle sensor 4; a mobile telephone line 5; and a server 6.

The drive recorder 1 records driving condition data of a vehicle (including image data and traveling data) when a traffic accident occurs or during dangerous driving, etc. A structure and an operation of the drive recorder 1 will be described in detail later The mobile telephone terminal 2 is brought into the interior of a vehicle by the driver (or another person in the vehicle), and equipped with not only a basic function of wirelessly performing voice and data communication via the mobile telephone line 5 but also an additional function of mutually communicating with a drive recorder 1, via a wire or wirelessly. A detailed description will be given later of how the drive recorder 1 and the mobile telephone terminal 2 work together.

The ECU 3, being mounted in a vehicle, controls an operation of each part of the vehicle, and sends operation condition data of each part of the vehicle to the drive recorder 1 as an element of the driving condition data of the vehicle, the operation condition data including lighting condition data of various lamps (such as a headlamp, a tail lamp, a blinker lamp, and a hazard lamp), door locked/unlocked condition data, side-mirror folded/unfolded condition data, windshield-wiper operation condition data, power-window operation condition data, airbag operation condition data, ABS (antilock brake system) operation condition data, and the like.

The in-vehicle sensor 4, being mounted in a vehicle, detects a condition of each part of the vehicle and ambient conditions around the vehicle. Examples of the in-vehicle sensor 4 include: an acceleration sensor that detects accelerations generated in the front-rear direction and in the left-right direction of the vehicle; a yaw rate sensor that detects a rotation speed of the vehicle around a vertical axis (a self-rotation speed of the vehicle); a vehicle speed sensor that detects a traveling speed of the vehicle, a wheel speed sensor that detects a rotation speed of a wheel (a tire), a steering angle sensor that detects a steering angle of a steering wheel, a steering torque sensor that detects a steering torque of a steering wheel, a brake pedal sensor that detects how much a brake pedal is depressed, a hydraulic pressure sensor that detects a hydraulic pressure of each part of the vehicle, an air pressure sensor that detects an air pressure of a tire, a temperature sensor that detects temperatures inside and outside the vehicle, a brightness sensor that detects brightness around the vehicle, a road surface sensor that detects a road surface condition, an inter-vehicular distance sensor that detects a distance from vehicles running in front of and behind the vehicle, an obstacle sensor (a corner sensor) that detects an obstacle around the vehicle, and a collision sensor that detects a collision of the vehicle with an object. The thus detected various data is sent from the in-vehicle sensor 4 to the drive recorder 1 as elements of the vehicle driving condition data.

The mobile telephone line 5 is a public telephone line to which the mobile telephone terminal 2 is connected, and the mobile telephone line 5 is provided by a telecommunication carrier.

The server 6 performs communication with the mobile telephone terminal 2 via the mobile telephone line 5, and is disposed in a police station, an insurance company, and the like.

(Structure and Operation of Drive Recorder)

Next, a structure and an operation of the drive recorder 1 will be described in detail. As shown in FIG. 1, the drive recorder 1 is provided with: a control portion 101; an imaging portion 102; a GPS (global positioning system) receiving portion 103; an acceleration sensor 104; an interface portion 105; a real time clock 106 (hereinafter, referred to as RTC 106); a storage portion 107; a communication portion 108; an operation portion 109; and a warning portion 110.

The control portion 101 takes overall control of the aforementioned operational portions 102 to 110 each provided as a function portion, and includes not only a CPU (central processing unit) but also a storage portion such as an ROM (read only memory) and an RAM (random access memory) (none of which is shown in the figures). The ROM is used as a storage region in which, for example, programs executed by the CPU are stored. The RAM is used not only as a working region for the CPU but also as a buffer region in which the driving condition data is stored temporarily, just for a predetermined period of time (ranging from several seconds to several minutes). An operation of the control portion 101 will be described in detail later.

The imaging portion 102 is provided with: a camera portion that shoots a moving image of surroundings of the vehicle (at least the front of the vehicle) at all times; and an image processing portion that performs predetermined image processing (including analog/digital conversion, noise elimination, color correction, image compression, and the like) on image data obtained thereby (none of which is shown in the figures). As a photoelectric conversion device forming the camera portion here, a CCD (charge coupled device) or a CMOS (complementary metal oxide semiconductor) may be used. Moreover, it is advisable that the imaging portion 102 be fitted in a position (for example, on a back surface of a rearview mirror) that allows the imaging portion 102 to properly shoot a moving image of a scene ahead of the vehicle, and at which the imaging portion 102 does not block a driver's field of view. As described above, with the image data captured as a moving image of the surroundings of the vehicle included in the driving condition data as an element thereof, it is possible to perform a smooth and appropriate investigation of a cause of a traffic accident.

Although the embodiment described in the foregoing deals with a structure in which the moving image of the surroundings of the vehicle is shot all the time without a stop, this is not meant to limit the structure of the present invention; for example, the moving image shooting may be performed intermittently at predetermined intervals, or still image shooting may be performed. Such structures allow the RAM incorporated in the control portion 101 and the storage portion 107 to have a reduced storage capacity.

The GPS receiving portion 103 outputs, to the control portion 101, vehicle positional data indicating a current position (latitude, longitude, and altitude) of the vehicle, using a satellite signal from a GPS satellite. As described above, with the positional data included in the driving condition data as an element thereof, it is possible to analyze, after the occurrence of a traffic accident, the route to the traffic accident site taken by a vehicle involved in the traffic accident.

The acceleration sensor 104 detects acceleration in each of three axial directions that are orthogonal to one another (an X-axis direction (i.e., in a direction in which the vehicle proceeds), a Y-axis direction (i.e., in a left-right direction of the vehicle), a Z-axis direction (i.e., in an up-down direction of the vehicle)), and outputs the data as acceleration data to the control portion 101. As a method of detecting the acceleration data, a piezoresistance method or a capacitance method can be used. As described above, with the acceleration data indicating the acceleration of a vehicle included in the driving condition data as an element thereof, it is possible to analyze a shock applied to the vehicle in a traffic accident after the occurrence of the traffic accident.

The interface portion 105 receives the operation condition data of each part of the vehicle from the ECU 3 mounted in the vehicle and various detection data inputted from the in-vehicle sensor 4, and outputs the data to the control portion 101. As described above, with not only information obtained by the main body of the drive recorder 1 but also information obtained from outside the drive recorder 1 (e.g., obtained by equipment already mounted in the vehicle, such as the ECU 3 and the in-vehicle sensor 4) included in the driving condition data as elements thereof, it is possible to collect various kinds of data as the driving condition data without increase in size and cost of the drive recorder 1.

The RTC 106 generates time data indicating date and time and outputs the time data to the control portion 101. As described above, with time data indicating date and time included in the driving condition data of the vehicle as an element thereof, it is possible to analyze the time course leading to a traffic accident after the occurrence of the traffic accident.

As described above, in the drive recorder 1 of this embodiment, the imaging portion 102, the GPS receiving portion 103, the acceleration sensor 104, the interface portion 105, and the RTC 106 each function as a data collection portion that collects the driving condition data in a time series. However, this is not meant to limit the structure of the present invention; for example, the GPS receiving portion 103 and the acceleration sensor 104 incorporated inside the body of the drive recorder 1 may be connected to the drive recorder 1 as external components, and part of the in-vehicle sensors 4 which is disposed outside the drive recorder 1 may be incorporated inside the main body of the drive recorder 1.

The storage portion 107 is formed such that, when a predetermined trigger condition (described in detail later) is satisfied, the storage portion 107 stores thereinto, in a non-volatile manner, the driving condition data buffered in the control portion 101, and the storage portion 107 may be built as a semiconductor memory such as flash memory, EEPROM (electrically erasable and programmable read only memory), or large-capacity storage device such as a hard disc drive. The storage portion 107 may be attachable and detachable with respect to the drive recorder 1 if priority is given to portability of the driving condition data, or may be undetachable from the drive recorder 1 if priority is given to protection of the driving condition data from falsification. Furthermore, contents of the driving condition data stored in the storage portion 107 are not limited to what is described above; all the data inputted in the control portion 101 may be stored in the storage portion 107 if priority is given to achievement of a thorough analysis of a traffic accident performed after the occurrence of the traffic accident, or only part of the data inputted in the control portion 101 may be stored in the storage portion 107 if priority is given to reduction of the storage capacity of the storage portion 107. Moreover, the above-described driving condition data may be stored encrypted to thereby prevent unauthorized copying of the driving condition data.

The communication portion 108 mutually communicates with the mobile telephone terminal 2, via a wire or wirelessly. In a case of connecting the drive recorder 1 to the mobile telephone terminal 2 by a cable, a USB port or an UART (universal anachronous receiver transmitter) port may be used. In a case of wirelessly connecting the drive recorder 1 to the mobile telephone terminal 2, an infrared communication (IrDa: infrared data association) port or a wireless LAN (local area network) port (or a Wi-Fi communication port), or a Bluetooth (registered trademark) port may be used. That is, the communication portion 108 is structured to mutually communicate with the mobile telephone terminal 2 via a universal communication port mounted in the mobile telephone terminal 2. This structure makes it possible to establish mutual communication between the drive recorder 1 and the mobile telephone terminal 2 with no need of equipping the mobile telephone terminal 2 with additional hardware or modifying the hardware of the mobile telephone terminal 2.

The operation portion 109 is operated by a user, and is formed with a bottom, a switch, a touch panel, and the like.

The warning portion 110 gives, according to an instruction from the control portion 101, a warning to a driver that he or she should refrain from driving in a dangerous manner. This warning may be given in the form of a sound or an image (or a combination of both). This structure, permitting such a warning to be outputted, forces a driver to always drive carefully, which contributes to reducing traffic accidents. When the control portion 101 detects sudden starting, sudden steering, sudden braking, sudden gear change, no lighting at night, and lane change unaccompanied by operation of a blinker, uncontrolled steering, sudden narrowing of a headway distance to another vehicle or a building around itself, and the like, the control portion 101 instructs the warning portion 110 to output the above-described warning. The warning portion 110 also serves as means for alerting drivers in a traffic-accident-information sharing service, and a description will be given later in this regard.

(Driving Condition Data Storing Operation)

Next, an operation of storing the driving condition data performed by the control portion 101 will be described in detail. The control portion 101 determines that a predetermined trigger condition is satisfied and controls the storage portion 107 to store the driving condition data when the acceleration of the vehicle detected by the acceleration sensor 104 exceeds a predetermined threshold value (when an impact exceeding a predetermined threshold value is applied to the vehicle), when the operation portion 104 receives a predetermined operation by a user (such as the pressing down of a traffic accident reporting button), when the control portion 101 receives a request from the mobile telephone terminal 2 via the communications portion 108, or when it is determined that warning by the warning portion 110 is necessary. The driving condition data stored in the storage portion 107 here refers to the driving condition data temporarily stored in the RAM of the control portion 101 for a predetermined period of time (ranging from several seconds to several minutes) around the time when the above-described trigger condition is satisfied.

Thus, with the drive recorder 1 mounted in the vehicle, a driver unwilling to have a traffic accident caused by his or her negligence recorded therein always tries to drive safely, which contributes to reducing traffic accidents. If a driver should be involved in a traffic accident despite the fact that he or she deserves no blame for the traffic accident, performance of an analysis of the driving condition data recorded in the drive recorder 1 after the occurrence of the traffic accident will help prove that the driver is innocent.

(Combination Operation of Drive Recorder and Mobile Telephone Terminal)

Next, a detailed description will be given of how the control portion 101 makes the drive recorder 1 and the mobile telephone terminal 2 work together.

As described above, the drive recorder 1 of this embodiment is provided with the communications portion 108 that performs mutual communication with the mobile telephone terminal 2, via a wire or wirelessly; the control portion 101 controls the communication portion 108 such that the communication portion 108 transmits and receives to and from the mobile telephone terminal 2, the above-described driving condition data and operation setting data for the setting and operation of the drive recorder 1 (e.g., a trigger condition for determining, based on current driving condition data, whether or not a traffic accident or dangerous driving has occurred, and firmware executed by the control portion 101).

With this structure, it is possible to access the driving condition data recorded in the drive recorder 1 and to confirm/change the operation setting of the drive recorder 1 by using the mobile telephone terminal 2, which is predominantly widespread compared with a personal computer, and this makes it possible to provide the drive recorder 1 offering enhanced user-friendliness.

For example, if a driver has a traffic accident, the driver can promptly access the driving condition data recorded in the drive recorder 1 by using his or her own mobile telephone terminal 2, and this makes it possible for the driver to make a quick and correct report of a current situation to the police or the insurance company.

If a driver is involved in a traffic accident with another party, the driver is able to refer to the driving condition data recorded in the drive recorder 1 at the accident site while negotiating with the other party over rating blame of each party to reach a settlement; this reduces the risk of the driver being unduly disadvantaged by being argued down by the other party making an unfair one-sided story. Moreover, this structure makes it difficult for a party having more responsibility for a traffic accident to unduly claim compensatory payment, and this contributes to improvement of driving manners and reduction of staged traffic accidents carried out by a fraud.

In the drive recorder 1 of this embodiment, the control portion 101, on determining that the above-described trigger condition is satisfied, controls the storage portion 107 to thereby permit the storage portion 107 to store the driving condition, and simultaneously controls the communication portion 108 such that the communication portion 108 automatically sends the driving condition data to the mobile telephone terminal 2. With this structure, the driving condition data recorded in the drive recorder 1 is automatically sent to the mobile telephone terminal 2 without an operation by the driver, and this makes it easy for the driver to access the driving condition data.

The mobile telephone terminal 2 of this embodiment is provided with a transfer function portion (not shown) that transfers the driving condition data, upon receiving it from the drive recorder 1, to a predetermined server 6 via the mobile telephone line 5. With this structure, the mobile telephone terminal 2 itself reports, when a traffic accident occurs, a condition of the traffic accident to the police or the insurance company. This makes it possible for reporting of the traffic accident to be accomplished without delay even if the driver has been so seriously injured as to lose consciousness or the driver is in a stupor; furthermore, this leads to prevention of falsification of the driving condition data.

Moreover, the mobile telephone terminal 2 of this embodiment is provided with a transmission request function portion (not shown) that, on receiving a predetermined operation by the user, requests the drive recorder 1 to transmit the driving condition data to the mobile telephone terminal 2. With this structure, it is possible to use the mobile telephone terminal 2 as a remote controller of the drive recorder 1.

Moreover, the mobile telephone terminal 2 of this embodiment is provided with a transmission request function portion (not shown) that, in response to a request from the server 6, requests the drive recorder 1 to transmit the driving condition data to the mobile telephone terminal 2.

For example, on recognizing a traffic accident having occurred at a certain location, the server 6 transmits information of time and location of the accident to an unspecified plurality of mobile telephone terminals 2 within an area for which a base station closest to that location is responsible, and requests the mobile telephone terminals 2 to transfer to the server 6 the driving condition data recorded in each of the drive recorders 1 corresponding to the mobile telephone terminals 2. Each of the mobile telephone terminals 2, on receiving the request from the server 6, requests the corresponding drive recorder 1 to transmit thereto the driving condition data and, transfers the driving condition data received from the drive recorder 1 to the server 6 via the mobile telephone line 5.

Construction of such a traffic information system improves the information collection ability of the server 6, which contributes to performing more accurate analysis of a traffic accident after the occurrence of the traffic accident.

However, it is preferable that the transfer function portion of the mobile telephone terminal 2 operates in the following manner: Prior to the above-described transfer operation, the transfer function portion analyzes time data and vehicle positional data included in the driving condition data and the time information indicating the time of the occurrence of the traffic accident and the positional information of the traffic accident site received from the server 6, and, only when determining that there is a strong possibility of the driving condition data that is recorded in the drive recorder 1 being useful for analyzing the traffic accident after its occurrence, in other words, only when determining that there is a strong possibility of how the traffic accident occurred being recorded in the drive recorder 1, the transfer function portion proceeds to transfer the driving condition data to the server 6. With this structure, it is possible to reduce unwanted communication traffic of the mobile telephone line 5, and to perform a smooth analysis of a traffic accident after the occurrence of the traffic accident.

Moreover, the transmission request function portion and the transfer function portion of the mobile telephone terminal 2 are special function portions that are necessary only for enabling the mobile telephone terminal 2 to work together with the drive recorder 1 or for building the above-described traffic information system. Thus, as means for realizing these function portions, it is a preferable that, instead of adding hardware to realize them, a predetermined program be installed in the mobile telephone terminal 2 to make an arithmetic processing portion (not shown) that executes the program function as the transmission request function portion and the transfer function portion in a software manner. With this structure, it is possible to realize cooperation between the drive recorder 1 and the mobile telephone terminal 2, and building of the above-described traffic system, with no need to provide additional hardware to the mobile telephone terminal 2 or to modify the mobile telephone terminal 2.

(Modified Example of Driving Condition Data Storing Operation)

Figure 2:
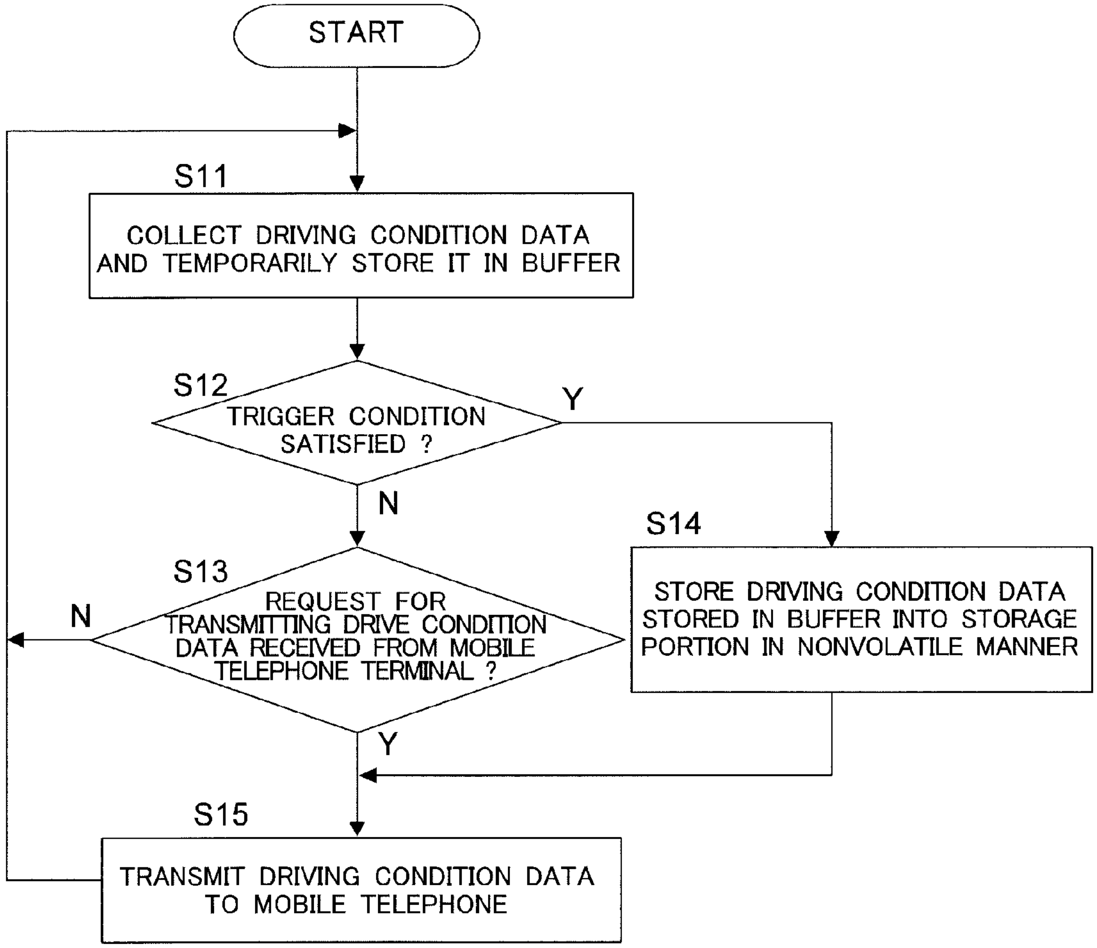
FIG. 2 is a flow chart of an operation performed by a drive recorder (conditional storage type)

It can be said that the above-described drive recorder 1 is specified such that it stores the driving condition data in the storage portion 107 in a nonvolatile manner when the trigger condition is satisfied (for the sake of simplicity, hereinafter, referred to as "conditional storage specification"). An outline of an operation performed by the drive recorder 1 of the conditional storage specification is shown in a flowchart of FIG. 2.

That is, the drive recorder 1 continuously performs an operation of collecting the driving condition data and temporarily storing it in a buffer (the RAM, etc., of the control portion 101) (step S11), an operation of monitoring whether or not the trigger condition is satisfied (step S12), and an operation of monitoring whether or not a driving condition data transmission request is received from the mobile telephone terminal 2 (step S13).

When the trigger condition is satisfied (Y in step S12), the drive recorder 1 stores, into the storage portion 107, in a nonvolatile manner, the driving condition data stored in the buffer (step S14), and transmits the driving condition data to the mobile telephone terminal 2 (step S15). When receiving a driving condition data transmission request from the mobile telephone terminal 2 (Y in step S13), the drive recorder 1 transmits the driving condition data to the mobile telephone terminal 2 (step S15). When the requested data transmission is thus completed, the process returns to step S11.

With the drive recorder 1 of "the conditional storage specification" as described above, it is possible to store the driving condition data in the storage portion 107 efficiently (i.e., only when the trigger condition is satisfied). This makes it possible to reduce, as much as possible, a load of processing for recording the driving condition data, and to reduce an increase in the storage capacity of the storage portion 107.

On the other hand, when the drive recorder 1 is specified such that the driving condition data is constantly stored without interruption in the storage portion 107 (namely, in a nonvolatile manner) (for the sake of simplicity, hereinafter, the specification being referred to as "constant storage specification"), it is possible to prevent any leakage of the driving condition data recorded therein as much as possible. Thus, it is easier to perform analysis related to the cause of a traffic accident and the like with the drive recorder 1 of the "constant storage specification" than with the drive recorder 1 of the "conditional storage specification."

For example, when a person or a bicycle comes into slight contact with the vehicle, there is a possibility that an impact received by the vehicle at that time is so small that the trigger condition is not satisfied (a value detected by the acceleration sensor does not exceed a predetermined threshold value). In such a case, with the drive recorder of the "conditional storage specification," the driving condition data at the time of the occurrence of the slight contact is not stored in the storage portion 107. This generally makes it difficult to check the corresponding part of the driving condition data after a traffic accident.

However, with the drive recorder 1 of the constant storage specification, the driving condition data when the slight contact occurs is also recorded in the storage portion 107, and this makes it possible to check the driving condition data after the occurrence of the slight contact. Consequently, it is possible to use the driving condition data to analyze a cause and the like of a traffic accident after its occurrence. It is undeniable that there is a possibility that, if, for example, a malfunction occurs to the various sensors, whether or not the trigger condition is satisfied may be determined incorrectly (thus, even when the trigger condition has been satisfied in a practical sense, it may not be determined that the trigger condition has been satisfied). Even in such case, it is possible to prevent leakage of the driving condition data if the drive recorder 1 of the constant storage specification is employed.

In the case of the drive recorder 1 of the constant storage specification, it is advisable that the driving condition data be continuously collected without interruption to be temporarily stored in the buffer (RAM, etc., of the control portion 101), and that all the temporary-stored driving condition data be then transferred to and stored into the storage portion 107 regardless of whether or not the trigger condition is satisfied. Moreover, in the case of the drive recorder 1 of the constant storage specification, the driving condition data continuously collected without interruption may be directly stored into the storage portion 107 without passing through the buffer. In any case, during the operation of the drive recorder 1 (e.g., while a power switch of the drive recorder 1 is in an on-state), the driving condition data is continuously collected without interruption, and is then stored into the storage portion 107 in a nonvolatile manner.

In an operation of storing the driving condition data into the storage portion 107, for example, when a storage area for the driving condition data inside the storage portion 107 is full, an area in which the oldest data is stored may be overwritten with the latest data. With this arrangement, it is possible to avoid shortage of the storage area for the driving condition data, and to preferentially retain, in the storage area, newer data of great importance.

Furthermore, in the drive recorder 1 of the constant storage specification, basically, the operation of storing the driving condition data into the storage portion 107 is continuously performed without interruption; however, there may be provided means for stopping the operation just in case (e.g., a switch for stopping the operation). Moreover, only part of the driving condition data may be constantly stored in the storage portion 107.

For example, the storing of the driving condition data may be performed such that, of all the driving condition data, only the image data captured by the imaging portion 102 is constantly stored without interruption into the storage portion 107, and that the other driving condition data is stored into the storage portion 107 only when the trigger condition is satisfied. By storing the driving condition data in this way, it is possible to prevent failure in image shooting when, for example, the trigger condition is not satisfied, and to reduce as much as possible an increase in a processing load, etc, involved in storing the data into the storage portion 107.

The imaging portion 102 may capture, instead of the image data of the surroundings of the vehicle, or in addition to that image data, image data of the interior of the vehicle. This makes it possible to store the image data of the interior of the vehicle into the storage portion 107. As a result, for example, even when a trouble occurs in a taxi between the taxi driver and a passenger, it is possible to later check the condition that has caused the trouble. Moreover, the imaging portion 102 may be able to capture images of the surroundings and the interior of the vehicle from various positions and at various angles, with a plurality of camera portions (imaging devices) disposed inside and outside the vehicle.

Figure 3:
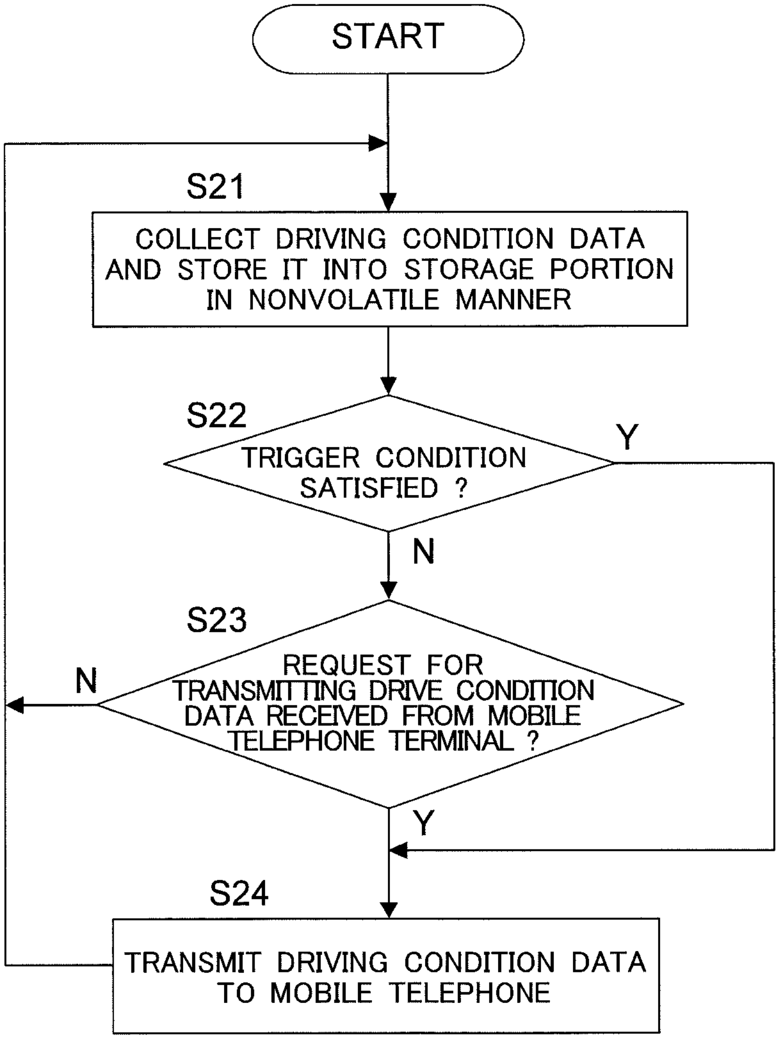
FIG. 3 is a flow chart of an operation performed by a drive recorder (unconditional storage type)

An outline of an operation performed by the drive recorder 1 of the constant storage specification is as shown in a flowchart of FIG. 3.

That is, the drive recorder 1 continuously performs: an operation of collecting the driving condition data and storing it into the storage portion 107 in the nonvolatile manner (step S21); an operation of monitoring whether or not the trigger condition is satisfied (step S22); and an operation of monitoring whether or not the driving condition data transmission request is received from the mobile telephone terminal 2 (step S23).

Then, when the trigger condition is satisfied (Y in step S22), or when the driving condition data transmission request is received from the mobile telephone terminal 2 (Y in step S23), the drive recorder 1 sends the driving condition data to the mobile telephone terminal 2 (step S24). When the requested data transmission is completed, the process returns to step S21.

For example, the specification of the drive recorder 1 may be set to the conditional storage specification or to the constant storage specification (that is, may be switchable between the conditional storage specification and the constant storage specification) according to an instruction given by a user (through operation on the operation portion 109, and the like). This makes it possible to achieve enhanced user-friendliness of the drive recorder 1. Moreover, as the driving condition data handled by the drive recorder 1, other than the kinds specifically described in the foregoing, various kinds of data can be adopted that indicate conditions of the driving (e.g., whether or not a vehicle is being driven, how the vehicle is driven, and the like).

As described above, the drive recorder 1 of the constant storage specification is provided with: a functional portion (a data collection and storage portion) that collects the driving condition data of a vehicle to store it therein in the nonvolatile manner; a functional portion (communications portion) that performs mutual communication with the mobile telephone terminal 2 either by using a cable or wirelessly; and a functional portion (control portion) that takes overall control of those functional portions mentioned above. The control portion controls the communication portion such that the communication portion transmits and receives the driving condition data and the operation setting data to and from the mobile telephone terminal 2, and also controls the data collection and storage portion such that the data collection and storage portion continuously collects and stores the driving condition data without interruption.

With the thus-structured drive recorder 1, it is easy to make it possible to access the driving condition data and to check and change the operation setting by using the mobile telephone terminal 2, which leads to enhanced user-friendliness of the drive recorder 1. Moreover, since the driving condition data is continuously collected without interruption and stored in the nonvolatile manner, it is possible to prevent leakage of the driving condition data as much as possible.

(Traffic Accident Information Sharing Service)

Figure 4:
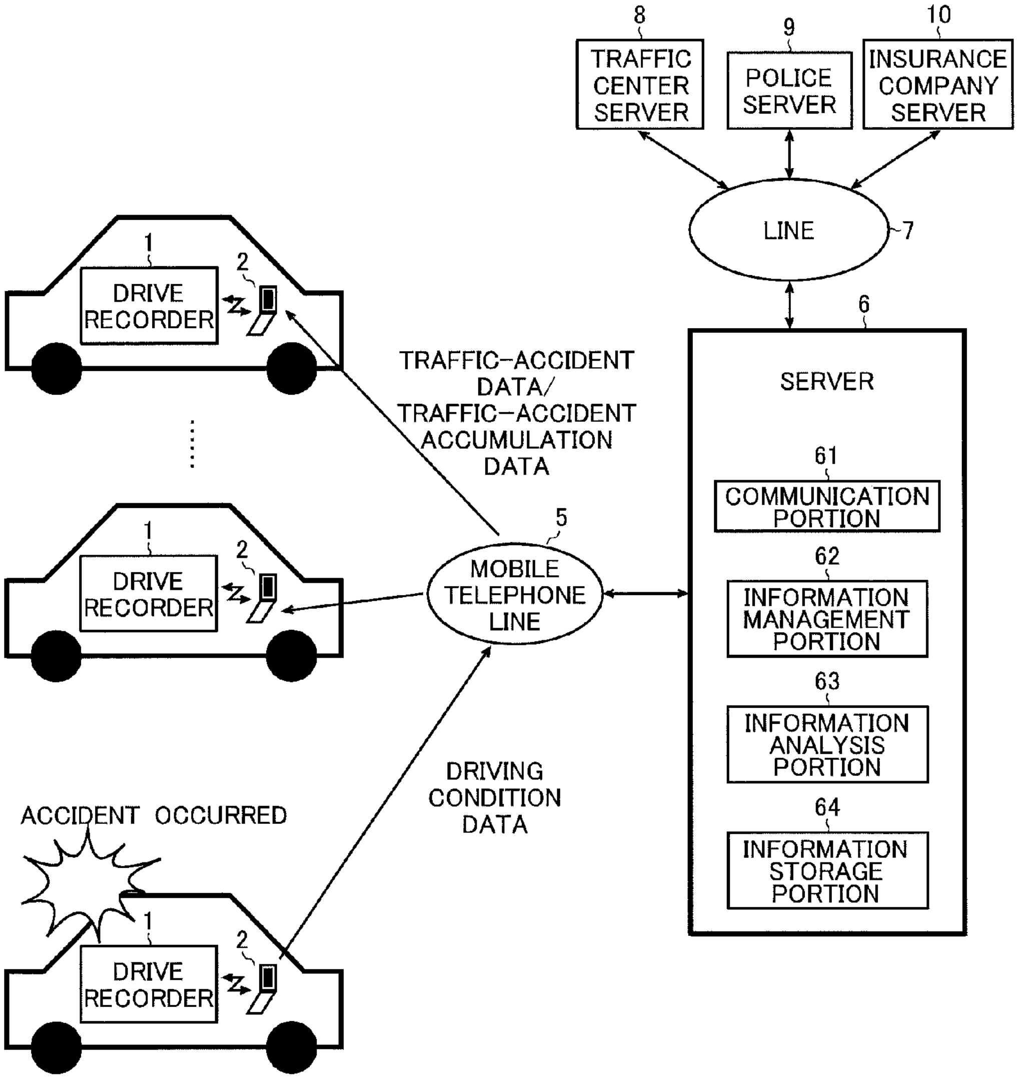
FIG. 4 is a schematic diagram for illustrating traffic-accident information sharing service.

Next, a service for sharing information concerning traffic accidents (i.e., traffic-accident information sharing service) for which the server 6 plays a principal role will be described in detail with reference to FIG. 4. As shown in FIG. 4, the server 6 that plays the principal part in realizing the above-described function is provided with: a communication portion 61; an information management portion 62; an information analysis portion 63; and an information storage portion 64.

The communication portion 61 not only performs communication with the mobile telephone terminal 2 via the mobile telephone line 5, but also performs communication with a traffic center server 8, a police server 9, and an insurance company server 10, via other lines 7 (such as dedicated lines or the Internet).

The information management portion 62 performs management (including acquisition, analysis, storage, and transmission) of the following data: the driving condition data which is transferred from the drive recorder 1 mounted in the vehicle involved in a traffic accident; traffic accident data (data indicating a location and time of the occurrence of the traffic accident, and the like) which is generated by analyzing the driving condition data; and traffic accidents accumulation data (data indicating a location and time at which traffic accidents have most frequently occurred, namely a traffic-accident-prone location and time) which is generated by accumulatively analyzing a plurality of traffic accident data.

The information analysis portion 63 analyzes the driving condition data transferred from the drive recorder 1 mounted in the vehicle involved in the traffic accident via the mobile telephone terminal 2, and then generates the aforementioned traffic accident data. The information analysis portion 63 also accumulatively analyzes a plurality of traffic accident data, and thereby generates the aforementioned accumulated traffic accident data.

The information storage portion 64 stores therein the driving condition data, the traffic accident data, and the accumulated traffic accident data described above in the nonvolatile manner.

Preferably, the server 6 is formed to work in cooperation with the traffic center server 8, the police server 9, and the insurance company server 10 such that the traffic-accident information (including the driving condition data, the traffic accident data, and the accumulated traffic accident data) can be shared among them. With this structure, it is possible to enhance information concerning traffic accidents (to increase the number of traffic accidents grasped as a parameter), and to achieve decentralized server function.

The server 6 structured as described above transmits, in response to a request from the mobile telephone terminal 2, latest accumulated traffic accident data to the mobile telephone terminal 2. The mobile telephone terminal 2 then transfers contents of what is received from the server 6 to the drive recorder 1. At this time, if communication between the mobile telephone terminal 2 and the drive recorder 1 is disabled, the contents of what is received from the server 6 is temporarily stored in the nonvolatile storage portion of the mobile telephone terminal 2, and when the communication with the drive recorder 1 is enabled, the mobile telephone terminal 2 transfers the latest accumulated traffic accident data to the drive recorder 1.

In the drive recorder 1 to which the mobile telephone terminal 2 has transferred the contents of what it had received, the control portion 101 updates old accumulated traffic accident data stored in the storage portion 107 to the latest accumulated traffic accident data, and then, based on the latest accumulated traffic accident data, controls the warning portion 110 to alert the driver. For example, when the accumulated traffic accident data includes information concerning a traffic-accident-prone location, the warning portion 110 alerts the driver of any vehicle that is approaching the traffic-accident-prone location. The alert may be given in the form of sound so as to announce a driver that he or she is approaching a traffic-accident-prone location, or may be given using a car navigation system separately mounted in a vehicle so as to show the driver the traffic-accident-prone location as a mark (an icon, etc.) on a displayed map.

It is preferable that the accumulated traffic accident data include, in addition to the information concerning a traffic-accident-prone location, supplementary information such as traffic-accident-prone time and causes of the traffic accidents. For example, if a flag indicating "frequent occurrence of collisions in turning into another road" is set, it is possible to alert the driver by giving him or her a warning in advance to the effect that he or she should thoroughly check the surroundings for safety; if a flag indicating "driving across the center line in curving at an excessively high speed" is set, it is possible to alert the driver by giving him/her a warning in advance to the effect that he or she should slow down sufficiently before entering the curve. Here, since it is often the case that, in order to include such supplementary information, analysis of the driving condition data from the drive recorders 1 mounted in the vehicles that have been involved in traffic accidents is not sufficient, it is preferable, as described above, that the server 6 work in cooperation with the traffic center serve 8, the police server 9, and the insurance company server 10 so that information concerning traffic accidents is made available among them.

Thus, with the traffic information system providing a traffic-accident information sharing service, with the server 6 as a main part of the system, it is possible to make the most of the drive recorder 1 as means for preventing a traffic accident; this serves as an incentive for purchase of the drive recorder, and hence, contributes to promotion of road safety.

Although the foregoing deals with, by way of example, the structure in which the server 6 transmits the latest accumulated traffic accident data in response to a request from the mobile telephone terminal 2, this is not meant to limit the structure of the present invention; for example, the latest accumulated traffic accident data may be transmitted regularly (e.g., once a month) from the server 6 to the mobile telephone terminal 2 which is registered in advance as a subscriber of the traffic-accident information sharing service. With this structure, it is possible to keep the accumulated traffic accident data stored in the drive recorder 1 up to date.

Although the foregoing deals with, by way of example, the structure in which the accumulated traffic accident data is transmitted to the mobile telephone terminal 2, this is not meant to limit the structure of the present invention; for example, at the time when the driving condition data is transferred from a vehicle involved in a traffic accident to the server 6, of all the above-described driving condition data, at least the positional information of the traffic accident location may be quickly transmitted to an unspecified plurality of mobile telephone terminals within an area for which a base station closest to that location is responsible. This structure makes it possible to inform, approximately in real time, drivers approaching that location of the fact that a traffic accident has occurred, and accordingly makes it possible for the drivers to look for an alternative route and the like, to thereby avoid a traffic jam or getting involved in a secondary traffic accident.

(Fuel-Efficient Driving Performance Evaluation Service)

Figure 5:
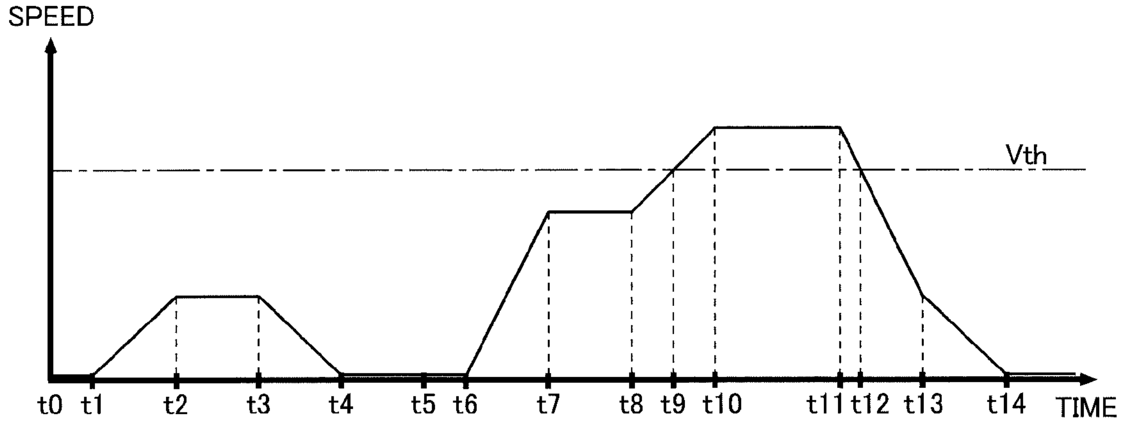
FIG. 5 is a time chart showing an example of driving conditions.

Next, a service for evaluating fuel-efficient driving performance (i.e., fuel-efficient driving performance evaluation service) in which the server 6 plays a main role will be described in detail with reference to FIGS. 5 and 6. FIG. 5 is a time chart showing an example of a driving condition, where the horizontal axis represents time and the vertical axis represents the speed of a vehicle. FIG. 6 is a data table showing an example of the driving condition data recorded under conditions shown in FIG. 5; specifically, FIG. 6 shows parameters necessary for the fuel-efficient driving performance evaluation service (time/date (ti), a vehicle position P(ti), a speed V(ti), acceleration A(ti), and the number of revolutions of an engine (hereinafter referred to as engine speed) R(ti), where i=0 to 14).

As to the series of parameters listed in FIG. 6, regardless of whether the drive recorder 1 is of the "conditional storage specification" or of the "constant storage specification," all of measurement values collected from the start of the operation of the engine operation until the end of the engine operation (namely during the operation of the drive recorder 1) are stored in the nonvolatile storage portion 107, with none of measurement values being discarded. On the other hand, regarding the driving condition data necessary for analyzing a traffic accident after the occurrence of the traffic accident, as described above, simply data collected during several seconds to several minutes around the time of the occurrence of the traffic accident is stored in the nonvolatile storage portion 107, and any data older than that is discarded in sequential order. Thus, of all the driving condition data, measurement values for the parameters necessary for the fuel-efficient driving performance evaluation service need to be stored for a long time (e.g., for 24 hours); however, since those parameters do not include image data collected by the imaging portion 102, there is no concern that the measurement values unduly occupy the storage capacity of the storage portion 107.

When the operation of the engine is started at time t0, the drive recorder 1 starts collecting and storing the driving condition data. A time interval at which the driving condition data is collected may be set to an appropriate value (e.g., every 0.5 seconds) taking balance between accuracy of analysis and data capacity into consideration. The time period from time t0 to time t1 is an idling period. The time period from time t1 to time t2 is an acceleration traveling period. The time period from time t2 to time t3 is a constant-speed traveling period. The time period from time t3 to time t4 is a deceleration traveling period. When the engine is stopped at time t4, the drive recorder 1 stops collecting and storing the driving condition data.

When the operation of the engine is restarted at time t5, the drive recorder 1 restarts collecting and storing the driving condition data. The time period from time t5 to time t6 is an idling period. The time period from time t6 to time t7 is an acceleration traveling period. The time period from time t7 to time t8 is a constant-speed traveling period. The time period from time t8 to time t10 is an acceleration traveling period. The time period from time t10 to time t11 is a constant-speed traveling period. The time period from time t11 to time t14 is a deceleration traveling period. When the engine is made to stop at time t14, the drive recorder 1 stops collecting and storing the driving condition data.

After that, when a driver performs operation for transferring the driving condition data by using the mobile telephone terminal 2, the driving condition data stored in the storage portion 107 is transferred to the server 6 via the mobile telephone terminal 2. The server 6 then analyzes the driving condition data received from the mobile telephone terminal 2 and, after evaluating the driving performance from the viewpoint of improving fuel-consumption efficiency, sends back a result of the evaluation to the mobile telephone terminal 2. The evaluation result may be sent to the mobile telephone terminal 2 as included in the text of an e-mail message, or instead, an URL (uniform resource locator) indicating where the evaluation result is accessible may be sent to the mobile telephone terminal 2.

Next, how to evaluate the driving performance from the viewpoint of improving fuel-consumption efficiency will be described in more detail. Examples of driving behaviors causing unnecessary fuel consumption include excessive speeding, sudden acceleration, sudden deceleration, and an excessive increase in engine speed (including engine acceleration with no load thereon) (hereinafter, these behaviors will be collectively referred to as "inefficient driving"). The server 6 calculates the ratio of a period of time elapsed during the above-described inefficient driving is performed in the total time period of one travel (in FIGS. 5 and 6, the total of time periods from time t0 to time t4, and from time t5 to time t14), and, based on a value obtained by the calculation, the driver is encouraged to drive in a fuel-efficient manner or a suggestion is made to the driver to drive in a fuel-efficient manner.

That is, the server 6, in the evaluation related to improving fuel-consumption efficiency, checks whether or not the speed V(ti) exceeds a predetermined upper limit Vth, whether or not the acceleration A(ti) exceeds a predetermined upper limit Ath+, whether or not the acceleration A(ti) falls below a predetermined lower limit Ath−, and whether or not the engine speed R(ti) exceeds a predetermined upper limit Rth, and, if at least one of these is found to exceed the corresponding predetermined upper limit, the server 6 determines that inefficient driving was being performed at time ti.

This will be described more specifically with reference to the driving condition shown in FIGS. 5 and 6 as an example. For the sake of simplicity, in the following explanation, the engine speed R(ti) is not considered in the evaluation, and the driving performance is evaluated from the viewpoint of improving fuel-consumption efficiency based on the speed V(ti) and the acceleration A(ti).

Regarding evaluation related to excessive speeding, speeds V(t9) to V(t12) are determined to exceed the predetermined upper limit Vth, and a period between times t9 and t12 is counted as an inefficient driving period (an excessive speeding period). Regarding the sudden acceleration, accelerations A(t6) to A(t7) are determined to exceed the predetermined upper limit Ath+, and a period between times t6 and t7 is counted as an inefficient driving period (a sudden acceleration period). Regarding the sudden deceleration, accelerations A(t11) to A(t13) are determined to be below the lower limit Ath− and a period between times t1 and t13 is counted as an inefficient driving period (a sudden deceleration period). Here, a period between times t11 and t12, which is both an excessive speeding period and a sudden deceleration period, is prevented from being counted twice.

After the above-described evaluation processing is completed, evaluation result data to be reported to the driver is generated at the server 6. The evaluation result may be reported by numerically indicating to what extent the driving was fuel-efficient based on the ratio of the inefficient driving in the travel, or by indicating a breakdown of the driving performance (e.g., fuel-efficient driving period: A %, idling period: B %, and inefficient driving period: C % (excessive speeding period: a %, sudden acceleration period: b %, and sudden deceleration period: c %)). It is effective to point out, any of the driving behaviors (e.g., excessive speeding) carried out during the travel that seems to have most contributed to the deterioration of fuel-consumption efficiency, and to advise the driver to refrain from such a driving behavior. Needless to say, as means for reporting to the driver the result of the evaluation of his or her fuel-efficient driving performance, which is received from the server 6, a display portion (such as a liquid crystal display panel or the like) may be used.

Thus, with the traffic accident information system providing the fuel-efficient driving performance evaluation service, in which the server 6 plays a main role, it is possible to make the most of the drive recorder 1 as supplementary means for helping the driver learn, carry out, and continue fuel-efficient driving operations; this makes a good incentive for drivers to purchase the drive recorder, and thus, greatly contributes to promoting environment protection.

With the structure where a detailed analysis of the driving condition data is not performed on the side of the drive recorder 1 but on the side of the server 6, there is no need to excessively enhance information processing performance of the drive recorder 1, and thus the structure does not invite an increase in size and cost of the apparatus.

It is advisable that the server 6 be formed such that results of the evaluations of fuel-efficient driving performance are accumulated therein. With this structure, it is possible to compare, with respect to each travel of a vehicle, the level of fuel-consumption efficiency achieved in one travel of the vehicle with that achieved in a preceding travel of the vehicle, or it is possible to obtain an average value of the levels of fuel-consumption efficiency achieved over a predetermined period of time, to thereby perform a more continuous analysis. Thus, it is possible to inform a driver of how much he or she has been improving in terms of fuel-efficient driving techniques, which helps make the driver more motivated to drive in a fuel-efficient manner.

In the example shown in FIGS. 5 and 6, the time period between times t0 and the time period between times t5 and t6 are both an idling period, during which the speed V(ti) and the acceleration A(ti) are both zero, and in light of the above-described evaluation criteria, these periods are not counted as inefficient driving periods. However, an excessively long idling period leads to unnecessary fuel consumption; to deal with this, the algorithm of evaluating the driving performance from the viewpoint of improving fuel-consumption efficiency may be appropriately changed such that an excessively long idling period is determined to be the ineffective driving.

For the sake of simplicity, the engine speed R(ti) has not been taken into consideration, and also, the other evaluation criteria are not specifically discussed in the foregoing; however, in order to perform more detailed evaluation on fuel consumption efficiency, it is preferable that another evaluation criterion such as whether or not a fluctuation of the speed V(ti) (repeated acceleration and deceleration) has occurred be added.

It is also preferable that the upper limit Vth of the speed V(ti), the upper limit Ath+ and the lower limit Ath− of the acceleration A(ti), and the upper limit Rth of the engine speed R(ti) be appropriately adjusted considering the difference of traveling conditions such as the difference between traveling on a flat and a sloping road, or the difference between traveling on a freeway and a local road. In order to adjust these threshold values, the driving condition data transferred from the drive recorder 1 to the server 6 needs to include information of a vehicle position P(ti).

The foregoing deals with the structure in which, of all the driving condition data collected by the drive recorder 1, as parameters necessary for the fuel-efficient driving performance evaluation service, the time/date (ti), the vehicle position P(ti), the speed V(ti), the acceleration A(ti), and the engine speed R(ti) are selected and continuously measured, and values thus obtained are stored for the period between times t0 and t4, and for the period between times t5 and t14, and then from the drive recorder 1, all the stored data is transferred to the server 6. this is not meant to limit how the present invention is practiced; This, however, is not meant to limit the structure of the present invention; in a case where priority is given to reduced capacity of the storage portion 107 and reduced communication data of the mobile telephone terminal 2 (and hence reduced communication cost), those parameters mentioned above may be stored in the storage portion 107, as indicated by the hatched areas in FIG. 6, only at start-up and shut-down of an engine and at inefficient driving, such that the contents stored in the storage portion 107 are transferred to the server 6. With such a structure, evaluation needs to be performed, on the drive recorder 1 side, relating to ineffective driving (excessive speeding, sudden acceleration, sudden deceleration, an excessively high engine speed, and the like); however, this is satisfactorily accomplished by comparing each parameter with the corresponding predetermined threshold value, and thus the information processing capacity of the drive recorder 1 does not need to be unnecessarily enhanced.

(Operation of Prohibiting Overwriting of Driving Condition Data)

Next, a detailed description will be given of an operation of prohibiting update of the driving condition data stored in the storage portion 107 in a nonvolatile manner.

With the drive recorder 1 of this embodiment, there is an upper limit to the number of driving condition data files that can be stored in the storage portion 107 in a nonvolatile manner, depending on the capacity of the storage portion 107 (for example, ten files stored by a sensor trigger and ten files stored by a manually operated trigger). After the number of the driving condition data files stored in a nonvolatile manner reaches the upper limit, to further store a file of new driving condition data into the storage portion 107 in a nonvolatile manner, a file of oldest driving condition data is overwritten. In this regard, the drive recorder of this embodiment is similar to conventional drive recorders.

However, with the drive recorder 1 of this embodiment, it is possible to give either an "overwritable property" or a "non-overwritable property" to each drive condition data file. At a time when a driving condition data file is stored into the storage portion 107 in a nonvolatile manner, the "overwritable property" is given to the file as a default property. Accordingly, unless the "non-overwritable property" is intentionally given to a driving condition data file, the file will eventually be overwritten with a new file, and thus will become inaccessible. On the other hand, if the "non-overwritable property" is intentionally given to a file, the file is excluded from targets to be overwritten; consequently, the file is not overwritten even when it is the oldest of files stored in the storage portion 107, and, unless a user intentionally deletes the file, it is possible to check what is in the driving condition data at any time.

For example, the following case is assumable: A driver is involved in a very minor collision while driving a vehicle; the driver manually stores the driving condition data in a nonvolatile manner just in case, but does not negotiate with the other party by checking the driving condition data stored in a nonvolatile manner, because there seems to be no particularly considerable problem either on the driver's side or on the other party's side; later, however, the driver finds a damage on his or her vehicle and wants to be compensated for it, or reversely, the other party requires compensation. In such a case, if the "non-overwritable property" is given to the driving condition file that is precautionarily stored at the time of the occurrence of the accident, the stored file will never be lost by being overwritten, and this makes it possible to later check, as necessary, the driving condition data stored at the time of the occurrence of the traffic accident, and thus to properly negotiate with the other party.

Figure 7:
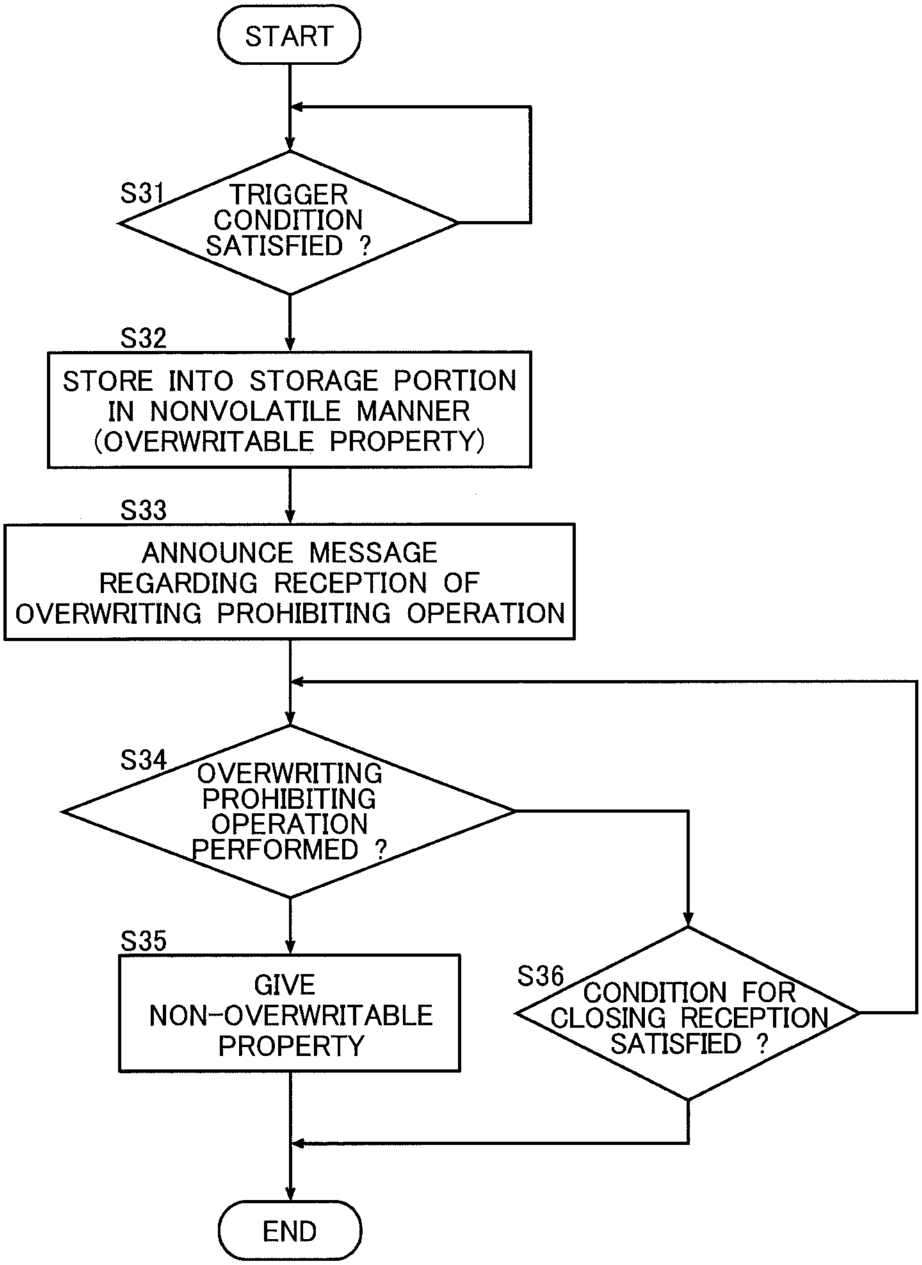
FIG. 7 is a flow chart showing an operation to prohibit overwriting driving condition data stored in a nonvolatile manner.

FIG. 7 is a flow chart showing an operation to prohibit overwriting driving condition data stored in a nonvolatile manner.

First, in step S31, it is determined whether or not the above-described predetermined trigger condition is satisfied. Here, in a case where it is determined that the predetermined trigger condition is satisfied (for example, in a case where an excessive impact is applied to the vehicle or in a case where a user performs a manual operation for storing the driving condition data), the flow proceeds to the next step S32. On the other hand, in a case where it is not determined that the predetermined trigger condition is satisfied, the flow returns to step S31, where the above-described trigger condition evaluation processing is repeated.

In the case where it is determined that the predetermined trigger condition is satisfied in step S31, the driving condition data that has been collected by that time is stored into the storage portion 107 in a nonvolatile manner in step S32. At this time, the "overwritable property" is given to the stored file of the driving condition data as the default property. Incidentally, the presence of the "overwritable property" does not necessarily need to be positively indicated by a dedicated flag; it is possible to regard the absence of the "non-overwritable property" as the presence of the "overwritable property."

In the next step S33, there is announced a message regarding reception of the operation of prohibiting the overwriting of the driving condition data. To accomplish this announcement, for example, a microphone may be provided for making a vocal announcement, saying, for example, "The driving condition data has just been stored; to prohibit overwriting this stored file, please press down the overwriting prohibition button provided in the main body," or a lamp may be provided to be turned on or to blink on and off to indicate the timing for starting the operation to prohibit overwriting. With such structures for accomplishing the announcement, the user is able to decide whether or not to give the stored file the "non-overwritable property" without delay at the time when the driving condition data is stored in a nonvolatile manner.

However, the announcement of the message in step S33 is not necessarily be indispensable; for example, in a case where a lamp is provided in the drive recorder 1 such that the lamp is turned on or blinks on and off while a driving condition data storing processing is being performed, the turning on or the blinking of the lamp may be used as a substitute for the above announcement, or a structure is possible such that the above announcement is not performed at all. In this way, the main body of the drive recorder 1 does not need to be provided with any additional component.

In the next step S34, whether or not the user has performed the overwriting prohibiting operation is determined. Here, in a case where it is determined that the user has performed the overwriting prohibiting operation, the flow proceeds to step S35. On the other hand, in a case where it is not determined that the user has performed the overwriting prohibiting operation, the flow proceeds to step S36.

Incidentally, as the above-described overwriting prohibiting operation, for example, the pressing down of a button dedicated to the overwriting prohibiting operation or the pressing down of a manual-storing button in the storing processing of the driving condition data may be detected.

With the latter structure, for example, if an excessive impact is applied to the vehicle, or the user presses down the button for manual-storing, it is determined that the predetermined trigger condition is satisfied in step S31, and the driving condition data that has been collected by the time point is stored into the storage portion 107 in step S32; and, if, while this storing processing is being performed, the button for manual-storing is found to have been pressed down by the user in step S34, this pressing down of the button may be recognized as the overwriting prohibiting operation. With this structure, merely partial rewriting of software for driving the control portion 101 makes it possible for the overwriting prohibiting operation to be received, without providing the main body of the drive recorder 1 with any additional component.

If it is determined, in step S34, that the user has performed the overwriting prohibiting operation, then in step S35, the "non-overwritable property" is given to the driving condition data file stored in the storage portion 107, and this completes the series of the flow. The file to which the "non-overwritable property" is given is excluded from targets to be overwritten; consequently, unless the user intentionally deletes the file, it is possible to check the contents of the driving condition data in the file at any time.

On the other hand, if it is not determined, in step S34, that the user has performed the overwriting prohibiting operation, then in step S36, it is determined whether or not a condition for closing reception of the overwriting prohibiting operation has been satisfied. Here, if it is determined that a predetermined condition for closing reception of the overwriting prohibiting operation has been satisfied, the "non-overwritable property" is not given to the driving condition data file stored in the storage portion 107, and the series of flow is finished to leave the driving condition imparted with the "overwritable property" which is the default property. On the other hand, if it is not determined that the predetermined condition for closing reception of the overwriting prohibiting operation has been satisfied, the flow returns to step S34, where determination of whether or not the user has performed the overwriting prohibiting operation is repeated.

It is advisable that, for example, separately from step S31, whether or not the predetermined trigger condition has been satisfied, that is, whether or not need for storing another set of driving condition data in a nonvolatile manner has been arisen be detected as the condition for closing the reception. In this case, from when a set of driving condition data is stored in a nonvolatile manner until the need arises for storing another set of driving condition data in a nonvolatile manner, it is possible to give the "non-overwritable property" to the latest set of driving condition data.

It is also advisable that, for example, whether or not a predetermined period of time (for example, ranging from several minutes to several hours) has passed after the trigger condition is found to be satisfied in step S31 be detected as the above-described condition for closing the reception. In this case, until a predetermined period of time passes since a set of driving condition data is stored in a nonvolatile manner, it is possible to give the "non-overwritable property" to the set of driving condition data.

It is also advisable that, for example, whether or not power supply to the drive recorder 1 has been shut down be detected as the above-described condition for closing the reception. In this case, from when a set of driving condition data is stored in a nonvolatile manner until the power supply to the drive recorder 1 is shut down, that is, generally, until the vehicle is stopped and the ignition key is turned off, it is possible to give the "non-overwritable property" to the set of driving condition data.

It is also advisable that, for example, whether or not storing processing with respect to the storage portion 10 in step S32 has been completed be detected as the above-described condition for closing the reception. In this case, the "non-overwritable property" can be given to a set of driving condition data only while the storing processing with respect to the storage portion 107 is being performed. Incidentally, in the case where this condition for closing the reception is adopted, it is desirable that the drive recorder 1 be provided with a lamp that is turned on while the storing processing of the driving condition data is performed, to thereby accomplish the announcement of the message in step S33.

The "non-overwritable property" may be given to the driving condition data when a recorded image is played back.

(System Structure of Drive Recorder)

Figure 8:
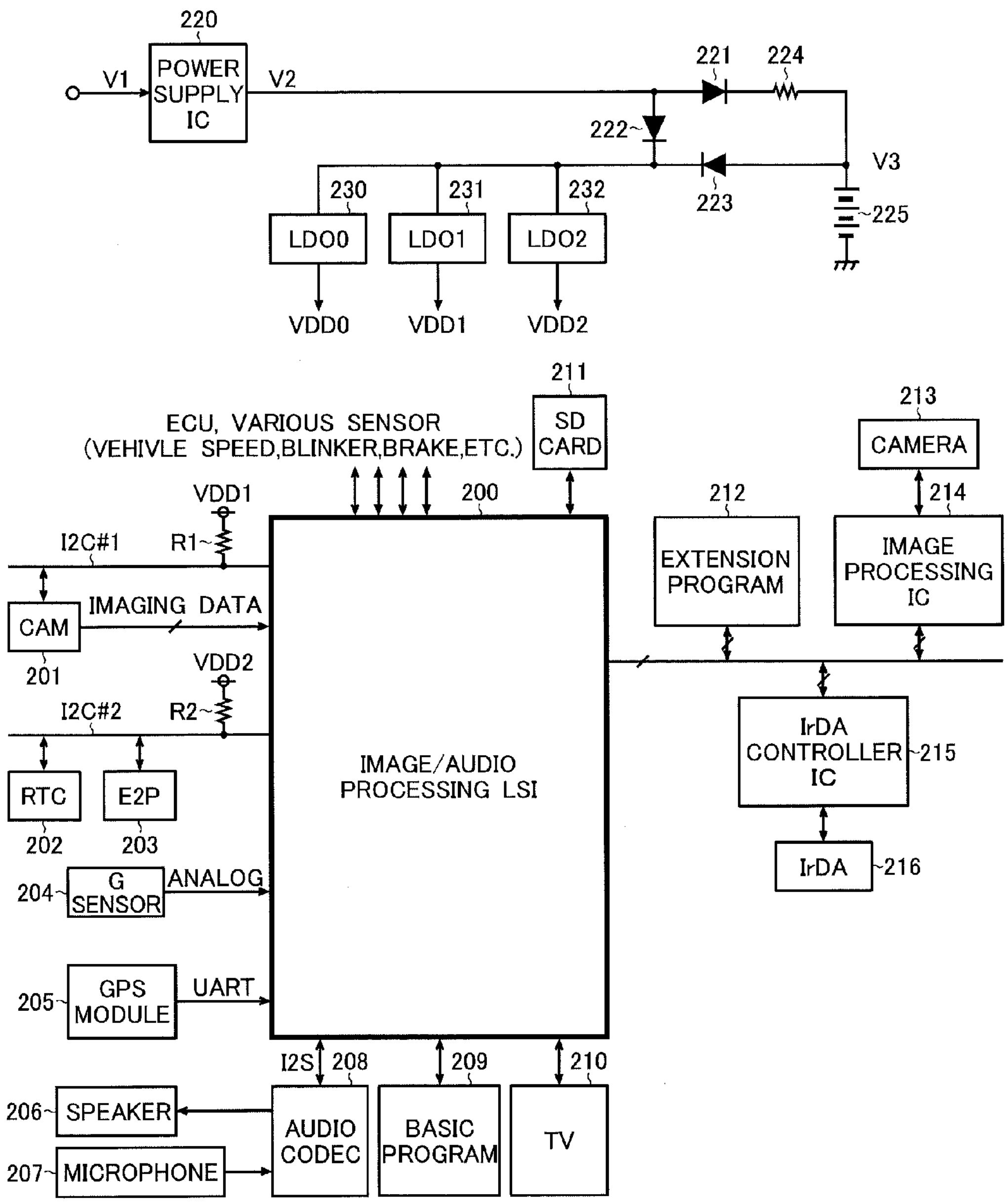
FIG. 8 is a system block diagram of a drive recorder according to the present invention.

FIG. 8 is a system block diagram showing a drive recorder according to the present invention. The drive recorder of this structure is used as means for recording driving condition data (including image data and traveling data) on the occasion of a traffic accident or during dangerous driving, etc., and the drive recorder includes: an image/audio processing LSI 200, a camera 201, a real time clock 202 (hereinafter referred to as an RTC [real time clock] 202), an EEPROM 203, an acceleration sensor 204, a GPS (global positioning system) module 205, a speaker 206, a microphone 207, an audio codec 208, a basic program storage memory 209, a television monitor 210, an SD card 211, an extension program storage memory 212, an optional camera 213, an image processing IC 214, an IrDA (infrared data association) controller IC 215 and an IrDA module 216.

The drive recorder of this structure includes, as its power supply system, a step-down regulator (a power supply IC) 220, diodes 221 to 223, a resistor 224, a secondary battery 225, and step-down regulators (LDO [low dropout] regulators) 230 to 232.

The image/audio processing LSI 200 is a controller that takes overall control of the operations of the drive recorder as a whole. To the image/audio processing LSI 200, from an ECU (electric control unit) (not shown) mounted in the vehicle, the following data is transmitted: operation condition data of the individual portions of the vehicle (such as data of lighting conditions of lamps (a head lamp, a tale lamp, a blinker lamp, a hazard lamp and the like), door locked/unlocked condition data, side-mirror folded/unfolded condition data, windshield-wiper operation condition data, power-window operation condition data, airbag operation condition data, ABS (antilock brake system) operation condition data, and the like.

The vehicle is provided with various in-vehicle sensors (not shown) that detect conditions of individual parts of the vehicle and ambient conditions around the vehicle. Various detection data obtained by these in-vehicle sensors are also transmitted to the image/audio processing LSI 200. Examples of the in-vehicle sensors include: an acceleration sensor that detects acceleration generated in the front-rear direction and in the left-right direction of the vehicle; a yaw rate sensor that detects a rotation speed of the vehicle around a vertical axis (a self-rotation speed of the vehicle); a vehicle speed sensor that detects a traveling speed of the vehicle, a wheel speed sensor that detects a rotation speed of a wheel (a tire), a steering angle sensor that detects a steering angle of a steering wheel, a steering torque sensor that detects a steering torque of a steering wheel, a brake pedal sensor that detects how much a brake pedal is depressed, a hydraulic pressure sensor that detects a hydraulic pressure of each part of the vehicle, an air pressure sensor that detects an air pressure of a tire, a temperature sensor that detects temperatures inside and outside the vehicle, a brightness sensor that detects brightness around the vehicle, a road surface sensor that detects a road surface condition, an inter-vehicular distance sensor that detects a distance from vehicles running in front of and behind the vehicle, an obstacle sensor (a corner sensor) that detects an obstacle around the vehicle, and a collision sensor that detects a collision of the vehicle against an object.

The camera 201 is an external device (driven by 2.8 V) that shoots ambient areas around the vehicle (mainly an area in front of the vehicle), and the camera 201 is connected to the image/audio processing LSI 200 through a two-line serial bus I2C#1. As a photoelectric conversion element of the camera 201, a CCD (charge coupled device) or a CMOS (complementary metal oxide semiconductor) is preferably used. Preferably, the camera 201 is fitted in a position (for example, on a back surface of a rearview mirror) that allows the camera 201 to appropriately shoot a scene ahead of the vehicle in the form of a moving image, and at which the imaging portion 102 does not block a driver's field of view. Imaging data generated by the camera 201 is outputted to the image/audio processing LSI 200 through a dedicated data bus. As described above, the driving condition data includes, as an element thereof, image data obtained by shooting a moving image of the surroundings of the vehicle, and this makes it possible to quickly and properly investigate the cause of a traffic accident.

The RTC 202 is an external device (driven by 3.3 V) that generates time data indicating the date and time and outputs it to the image/audio processing LSI 200, and is connected to the image/audio processing LSI 200 through a two-line serial bus I2C#2. As described above, with time data indicating date and time included in the driving condition data of the vehicle as an element thereof, it is possible to analyze, after a traffic accident, the time course leading to the occurrence of the traffic accident.

The EEPROM 203 is an external device (driven by 3.3 V) that stores, when a predetermined trigger condition is satisfied, the vehicle operation condition data buffered in the image/audio processing LSI 200 in a nonvolatile manner, and that is connected to the image/audio processing LSI 200 through the two-line serial bus I2C#2.

For example, when the acceleration of the vehicle detected by the acceleration sensor 204 exceeds a predetermined threshold value (that is, when an impact exceeding a predetermined threshold value is applied to the vehicle), the image/audio processing LSI 200 determines that the predetermined trigger condition is satisfied, and accesses the EEPROM 203 to store the driving condition data into the EEPROM 203. Here, the driving condition data stored in the EEPROM 103 is data that is temporarily stored in the image/audio processing LSI 200 for a predetermined period of time (ranging from several seconds to several minutes) around the time when the trigger condition is satisfied.

The two-line serial bus I2C#1 is pulled up, via a resistor R1, to a terminal to which a first interface voltage VDD1 (2.8 V) is applied. The two-line serial bus I2C#2 is pulled up, via a resistor R2, to a terminal to which a second interface voltage VDD2 (3.3 V) is applied.

As described above, the image/audio processing LSI 200 has the two systems of serial buses so as to fit different power supply voltages of different external devices connected thereto. However, within the image/audio processing LSI 200, the two-line serial buses I2C#1 and I2C#2 are treated as one system. With this structure, even when a plurality of external devices having different power supply voltages are connected, appropriate grouping of the external devices is performed based on their power supply voltages, and the individual groups (in the above description, the 2.8 volt driven group and the 3.3 volt driven group) are connected to the serial buses of different systems, which helps prevent waste of power and degradation of noise resistance resulting from a difference between high-level voltages. Adoption of the above structure makes it possible to reduce burdens on the design of the image/audio processing LSI 200 (e.g., selection of components, stabilization of the power supply and parts associated therewith to make full use of an external device by an interface voltage within an operation guaranteed range), the design of a PCB, and quality evaluation.

The image/audio processing LSI 200 incorporates a bus interface circuit for treating the externally connected two systems of the two-line serial buses I2C#1 and I2C#2 as the same bus within the device; the structure and the operation of the bus interface circuit will be described in detail later.

The acceleration sensor 204 detects acceleration in each of three different axial directions that are orthogonal to one another (an X-axis direction (i.e., in a direction in which the vehicle proceeds), a Y-axis direction (i.e., in a left-right direction of the vehicle), a Z-axis direction (i.e., in an up-down direction of the vehicle)), and outputs the data as acceleration data to the image/audio processing LSI 200. As a method of detecting the acceleration data, a piezoresistance method or a capacitance method can be used. As described above, with the acceleration data indicating the acceleration of a vehicle included in the driving condition data as an element thereof, it is possible to analyze a shock applied to the vehicle in a traffic accident after the occurrence of the traffic accident.

The GPS module 205 uses a satellite signal from a GPS satellite to detect the current position (latitude, longitude and altitude) of the vehicle, and outputs it as vehicle positional data to the image/audio processing LSI 200. The image/audio processing LSI 200 is connected to the GPS module 205 with a wire via a UART (universal asynchronous receiver transmitter) communication port. As described above, with the vehicle positional data included in the driving condition data of the vehicle as an element thereof, it is possible to analyze, after the occurrence of a traffic accident, a route, taken by the vehicle, to the occurrence of the traffic accident.

The speaker 206 and the microphone 207 are connected to the image/audio processing LSI 200 via the audio 208. For example, the speaker 206 is used as means for giving, based on an instruction from the image/audio processing LSI 200, a warning to a driver to refrain from driving dangerously. The warning is preferably performed by sound outputted from the speaker 206 or an image (or a combination of them) displayed on the television monitor 210. This structure, permitting such a warning to be outputted, forces a driver to always drive carefully, which contributes to reducing traffic accidents. When the image/audio processing LSI 200 detects sudden starting, sudden steering, sudden braking, sudden gear change, no lighting at night, and lane change unaccompanied by operation of a blinker, uncontrolled steering, sudden narrowing of a headway distance to another vehicle or a building around itself, and the like, the image/audio processing LSI 200 instructs the speaker 206 or the television monitor 210 to output the above-described warning. The microphone 207 is used, for example, as means for receiving a voice instruction from the driver.

The basic program storage memory 209 stores therein a program and data for performing basic operations of the image/audio processing LSI 200, and, for example, a flash memory (2M-bit) or the like can be used as the basic program storage memory 209.

The television monitor 210 displays, for example, images of the surroundings of the vehicle obtained by the camera 201, the video of a television broadcast program or the map information from a car navigation system; a liquid crystal display or the like can be used as the television monitor 210.

The SD card 211 is an external memory that can be attached to or detached from the drive recorder, and is used, for example, when the driving condition data stored in the EEPROM 103 is taken out or when the operation program for the image/audio processing LSI 200 is rewritten.

The extension program storage memory 212, the optional camera 213, the image processing IC 214, the IrDA controller IC 215, and the IrDA module 216 are each an optional device for extending the function of the drive recorder; they are each connected to the image/audio processing LSI 200 through a parallel bus for connection of an optional device.

The extension program storage memory 212 stores a program and data that cannot be stored in the basic program storage memory 209, and, for example, a flash memory (2M-byte) can be used as the extension program storage memory 212. The optional camera 213 acquires an image (for example, an image of an area behind the vehicle) from a viewpoint different from the viewpoint of the camera 201. The image processing IC 214 performs predetermined image processing (such as analog/digital conversion processing, noise removal processing, color correction processing and image compression processing) on image data captured by the optional camera 213, and outputs the resulting data to the image/audio processing LSI 200. The IrDA controller IC 215 and the IrDA module 216 perform infrared communication with a mobile telephone terminal or a remote controller.

The step-down regulator 220 is a power supply IC that steps down an input voltage V1 (for example, 12 V or 24 V) to generate an output voltage V2 (for example, 5.0 V).

An anode of the diode 221 is connected to an output terminal of the step-down regulator 220. A cathode of the diode 221 is connected via the resistor 224 to a positive pole of the secondary battery 225. An anode of the diode 222 is connected to the output terminal of the step-down regulator 220. A cathode of the diode 222 is connected to input terminals of the step-down regulators 230 to 232. An anode of the diode 223 is connected to the positive pole of the secondary battery 225. A cathode of the diode 223 is connected to the input terminals of the step-down regulators 230 to 232. The secondary battery 225 is charged by the output voltage V2 through a charge path via the diode 221 and the resistor 224, and a battery voltage V3 is drawn from its positive pole through a discharge path via the diode 223. Whichever of the output voltage V2 and the battery voltage V3 is higher is supplied to the step-down regulators 230 to 232.

The step-down regulators 230 to 232 generate an internal voltage VDD0 (for example, 1.5 V), the first interface voltage VDD1 (for example, 2.8 V) and the second interface voltage VDD2 (for example, 3.3 V), respectively, and supply them to the individual portions of the drive recorder.

Provision of the above-structured drive recorder in a vehicle contributes to the reduction of traffic accidents, because a driver, being unwilling to have a traffic accident caused by his or her negligence or dangerous driving recorded in the drive recorder, sticks to safe driving if the drive recorder is mounted in his or her vehicle. Furthermore, if a driver is involved in a traffic accident despite the fact that he or she deserves no blame for the traffic accident, the driver's innocence can be proved by analyzing, after the occurrence of the traffic accident, the driving condition data recorded in the drive recorder mounted in the vehicle.

Figure 9:
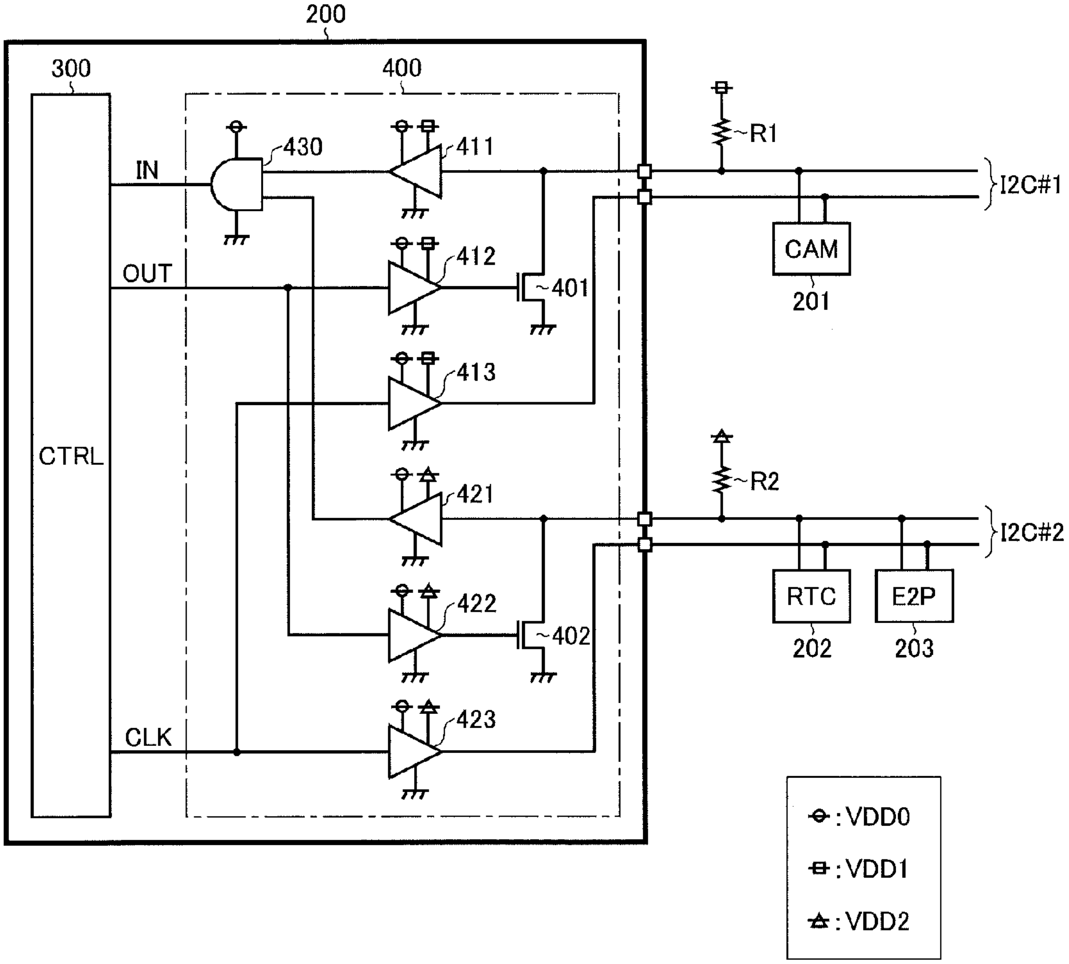
FIG. 9 is a circuit diagram showing an example of the structure (serial input/output) of a bus interface circuit.

FIG. 9 is a circuit diagram showing an example (serial input and output) of the structure of a bus interface circuit. As shown in this figure, the image/audio processing LSI 200 includes a controller 300 and the bus interface circuit 400.

The bus interface circuit 400 is a bidirectional bus multiplexer for treating the externally connected two systems of two-line serial buses I2C#1 and I2C#2 as the same bus within the device; the bus interface circuit 400 includes an N-channel MOS field effect transistor 401, an N-channel MOS field effect transistor 402, level shifters 411 to 413, level shifters 421 to 423 and a logical OR operation unit 430.

A drain of the transistor 401 is connected to a data line of the two-line serial bus I2C#1, and is pulled up, via the resistor R1, to a terminal to which the first interface voltage VDD1 is applied. A source of the transistor 401 is connected to a ground terminal. A drain of the transistor 402 is connected to a data line of the two-line serial bus I2C#2, and is pulled up, through the resistor R2, to a terminal to which the second interface voltage VDD2 is applied. A source of the transistor 402 is connected to a ground terminal. That is, the two-line serial buses I2C#1 and I2C#2 are each fed with an interface voltage corresponding to the power supply voltage of the external device connected thereto.

When the transistor 401 is on, the data line of the two-line serial bus I2C#1 is low (ground voltage GND). When the transistor 401 is off, the data line of the two-line serial bus I2C#1 is high (the first interface voltage VDD1). When the transistor 402 is on, the data line of the two-line serial bus I2C#2 is low (ground voltage GND). When the transistor 402 is off, the data line of the two-line serial bus I2C#2 is high (the second interface voltage VDD2).

An input terminal of the level shifter 411 is connected to the data line of the two-line serial bus I2C#1. An output terminal of the level shifter 411 is connected to a first input terminal of the logical OR operation unit 430. An input terminal of the level shifter 421 is connected to the data line of the two-line serial bus I2C#2. An output terminal of the level shifter 421 is connected to the second input terminal of the logical OR operation unit 430. An output terminal of the logical OR operation unit 430 is connected to a data signal input terminal of the controller 300.

The level shifter 411 level-shifts a pulse signal swung between the first interface voltage VDD1 and the ground voltage GND to a pulse signal swung between the internal voltage VDD0 and the ground voltage GND, and outputs the resulting pulse signal. The level shifter 421 level-shifts a pulse signal swung between the second interface voltage VDD2 and the ground voltage GND to a pulse signal swung between the internal voltage VDD0 and the ground voltage GND, and outputs the resulting signal. The logical OR operation unit 430 performs a logical OR operation on the pulse signals inputted from the level shifters 411 and 421, and thereby generates a logical OR signal swung between the internal voltage VDD0 and the ground voltage GND, and sends it as an input data signal IN to the controller 300.

Input terminals of the level shifters 412 and 422 are connected to a data signal output terminal of the controller 300. An output terminal of the level shifter 412 is connected to a gate of the transistor 401. An output terminal of the level shifter 422 is connected to a gate of the transistor 402.

The level shifter 412 level-shifts an output data signal OUT from the controller 300 swung between the internal voltage VDD0 and the ground voltage GND to a pulse signal swung between the first interface voltage VDD1 and the ground voltage GND, and outputs the resulting pulse signal. The level shifter 422 level-shifts the output data signal OUT from the controller 300 swung between the internal voltage VDD0 and the ground voltage GND to a pulse signal swung between the second interface voltage VDD2 and the ground voltage GND, and outputs the resulting pulse signal.

Input terminals of the level shifters 413 and 423 are connected to a clock signal output terminal of the controller 300. An output terminal of the level shifter 413 is connected to a clock line of the two-line serial bus I2C#1. An output terminal of the level shifter 423 is connected to a clock line of the two-line serial bus I2C#2.

The level shifter 413 level-shifts a clock signal CLK from the controller 300 swung between the internal voltage VDD0 and the ground voltage GND to a pulse signal swung between the first interface voltage VDD1 and the ground voltage GND, and outputs the resulting pulse signal. The level shifter 423 level-shifts a clock signal CLK from the controller 300 swung between the internal voltage VDD0 and the ground voltage GND to a pulse signal swung between the second interface voltage VDD2 and the ground voltage GND, and outputs the resulting pulse signal.

As described above, the bus interface circuit 400 includes: a signal distribution function portion (the transistors 401 and 402 and the level shifters 412 and 422) that distributes a single output data signal OUT outputted from the controller 300 and that transmits it to each of the data lines of the two-line serial buses I2C#1 and I2C#2; and a signal distribution function portion (the level shifters 413 and 423) that distributes a single clock signal CLK outputted from the controller 300 and that transmits it to each of the clock lines of the two-line serial buses I2C#1 and I2C#2.

The bus interface circuit 400 also includes a signal combination function portion (the level shifters 411 and 421 and the logical OR operation unit 430) that combines a plurality of input signals inputted from the two-line serial buses I2C#1 and I2C#2 to generate the input data signal IN for the controller 300.

The bus interface circuit 400 also includes a level shift function portion (the level shifters 411 to 413 and 421 to 423) that converts, when signals are exchanged between the controller 300 and the two-line serial buses I2C#1 and I2C#2, the voltage levels of the signals between the internal voltage VDD0 fed to the controller 300 and the interface voltage VDD1 fed to the two-line serial bus I2C#1 or the interface voltage VDD2 fed to the two-line serial bus I2C#2.

As described above, the image/audio processing LSI 200 has the two system serial buses so as to fit different power supply voltages of different external devices connected thereto. However, within the image/audio processing LSI 200, the two-line serial buses I2C#1 and I2C#2 are treated as one system. With this structure, even when a plurality of external devices having different power supply voltages are connected, appropriate grouping of the external devices is performed based on their power supply voltages, and the individual groups (in the above description, the 2.8 V driven group and the 3.3 V driven group) are connected to the serial buses of different systems, which helps prevent waste of power and degradation of noise resistance resulting from a difference between high-level voltages. Thus, the adoption of the above structure makes it possible, for example, to use a conventional module (3.3 V system) and a latest module (2.8 V system) by connecting them to the same bus. Furthermore, the adoption of the above structure also make it possible to reduce burdens on the design of the image/audio processing LSI 200 (e.g., selection of components, stabilization of the power supply and parts associated therewith to make full use of an external device by an interface voltage within an operation guaranteed range), the design of a PCB, and quality evaluation.

Figure 10:
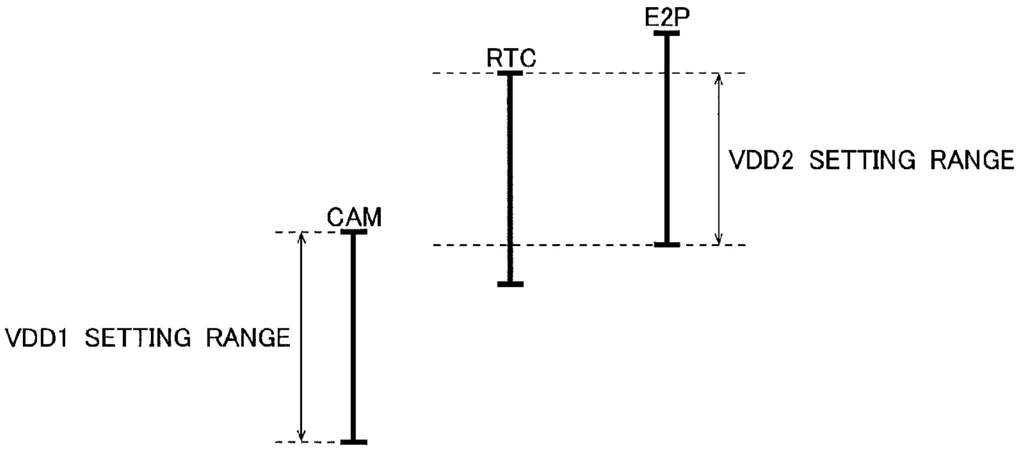
FIG. 10 is a diagram showing setting ranges for interface voltages VDD1 and VDD2.

FIG. 10 is a diagram showing the range of the interface voltages VDD1 and VDD2. As shown in this figure, even when the camera 201, the RTC 202, and the EEPROM 203 have different recommended ranges (operation guaranteed ranges) of the interface voltage, it is possible to significantly extend the possible range of the interface voltage VDD1 and the possible range of the interface voltage VDD2. Moreover, it is unnecessary to provide an additional voltage conversion interface IC (level shifter IC), and this eliminates the risk of inviting increase in cost and in set scale.

The controller 300 performs address control or chip select control on the external devices (the camera 201, the RTC 202, and the EEPROM 203) connected to the two-line serial buses I2C#1 and I2C#2. As described above, in a plurality of external devices connected to the buses, their signal outputting operations are adjusted mainly by the controller 300, and this prevents a problem from occurring when the signals of the two systems are combined.

(Trigger Judgment Algorithm)

Next, a detailed description will be given of trigger judgment (judgment of whether or not a specific driving behavior has occurred which requires nonvolatile storage operation of the driving condition data and warning operation to the driver).

Figure 11A:
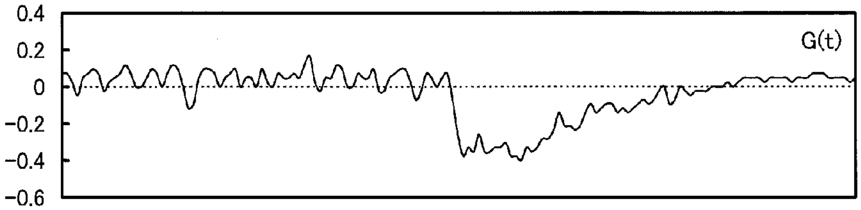
FIG. 11A is a time chart showing acceleration data G(t)

FIG. 11A is a time chart showing acceleration data G(t) measured at given sampling steps (for example 1/15 seconds) in the form of a time-series graph. The acceleration data G(t) in the figure may be taken as measured in any of the X-axis, Y-axis and Z-axis directions of a vehicle; however, in the following description, it is assumed that the acceleration data G(t) in FIG. 11A is one measured in the X-axis direction under a condition that the brake pedal is suddenly pressed down while the vehicle is travelling.

Figure 11B:
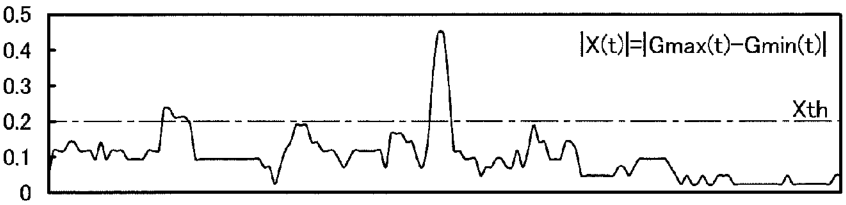
FIG. 11B is a time chart showing an absolute difference value $|X(t)|$.

FIG. 11B is a time chart illustrating how the above-mentioned trigger judgment is performed, with respect to the acceleration data G(t) indicated in the foregoing FIG. 11A, by sequentially calculating a differential value X(t) (=Gmax(t)−Gmin(t)) by subtracting a minimum value Gmin(t) from a maximum value Gmax(t) within a unit time period (from time (t−α) to time t, for example, α=1 second) and comparing an absolute differential value |X(t)| which is the absolute value of the differential value X(t) with a predetermined threshold Xth. As already mentioned, conventional drive recorders typically adopt the trigger judgment algorithm based on the absolute differential value |X(t)|. However, this trigger judgment algorithm is, as shown in FIG. 11B, so sensitive that it responds to an acceleration change attributable to a road surface condition (e.g. unevenness of a road surface), and unnecessarily activates a nonvolatile storage operation of recording the driving condition data in a nonvolatile manner or an unnecessary operation of warning the driver.

To overcome this inconvenience, according to the present invention, a drive recorder is structured such that the above-described trigger judgment is performed not on the basis of the above-described absolute differential value |X(t)|, but by generating, with respect to the acceleration data G(t) shown in the FIG. 11A referred to above, moving averages Y1(t) and Y2(t) of two systems that are temporally different from each other, to sequentially calculate a differential value Y(t) (=Y1(t)−Y2(t)) of the moving averages, and comparing an absolute moving average differential value |Y(t)|, which is the absolute value of the differential value Y(t), with a predetermined threshold value Yth.

Figure 11C:
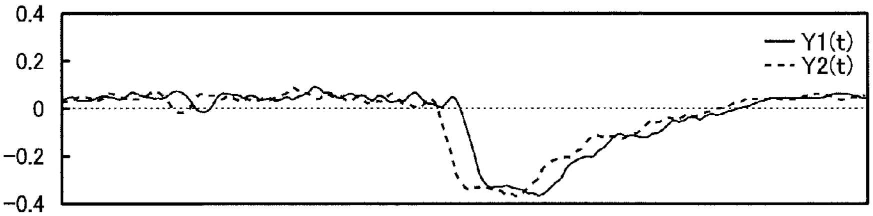
FIG. 11C is a time chart showing moving averages Y1(t) and Y2(t)
Figure 11D:
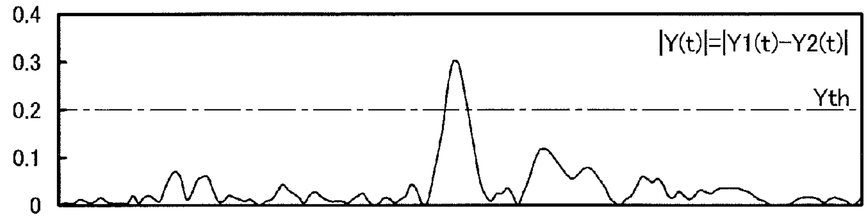
FIG. 11D is a time chart showing an absolute differential value |Y(t)| between moving averages.

FIG. 11C is a time chart showing the moving averages Y1(t) and Y2(t) in the form of a time-series graph. FIG. 11D is a time chart showing the absolute moving average differential value |Y(t)| in the form of a time-series graph.

As is clear from FIG. 11C, performing moving-averaging processing on the acceleration data G(t) helps obscure an acceleration change attributable to road surface conditions, but since the moving-averaging processing is liable to obscure a peak of an acceleration change due to a driving behavior (sudden braking) as well, there may be some cases in which simple comparison of the moving averages Y1(t) and Y2(t) with predetermined threshold values does not result in an appropriate trigger judgment.

This can be coped with by, as shown in FIG. 11D, calculating the absolute moving average differential value |Y(t)| from the two series of moving averages Y1(t) and Y2(t), which makes it possible to filter out any change in acceleration attributable to road surface conditions, and further, to mark only sudden driving behaviors (dangerous behaviors). Thus, by comparing the above-described absolute moving average differential value |Y(t)| with the predetermined threshold value Yth, it is possible to appropriately perform the trigger judgment.

Furthermore, with the above-described trigger judgment algorithm, in contrast to with the conventional structure where the acceleration value of a vehicle is directly compared with a threshold value, it is possible to perform trigger judgment that is independent of the setting condition (inclination) of the drive recorder main body or variation in absolute values obtained by the acceleration sensor, with the result that need for complicated calibration is eliminated.

Figure 12:
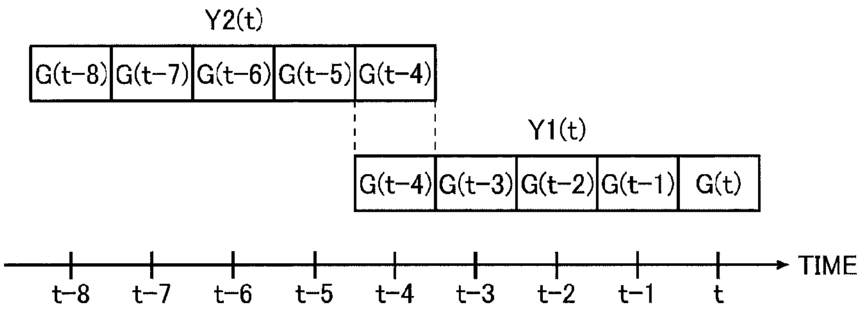
FIG. 12 is a schematic view for illustrating how to calculate the moving averages Y1(t) and Y2(t)

FIG. 12 is a schematic view for illustrating how to calculate the moving averages Y1(t) and Y2(t). It is assumed that, if the current time (current count) is t, the moving average Y1(t) is acquired by averaging five samples of acceleration data G(t) to G(t−4) (={G(t)+G(t−1)+G(t−2)+G(t−3)+G(t−4)}/5), and the moving average Y2(t) is acquired by averaging five samples of acceleration data G(t−4) to G(t−8) (={G(t−4)+G(t−5)+G(t−6)+G(t−7)+G(t−8)}/5).

That is, the moving averages Y1(t) and Y2(t) result from calculations performed with respect to two different time spans that are continuous and overlap by one sample of data commonly included therein as overlapping data (in FIG. 12, the acceleration data G(t−4)). The sampling number of the overlapping data (overlapping periods) may be set to any number with the sampling number of the moving averaging processing (moving average periods) in view; preferably, zero to several samples of overlapping data.

Figure 13:
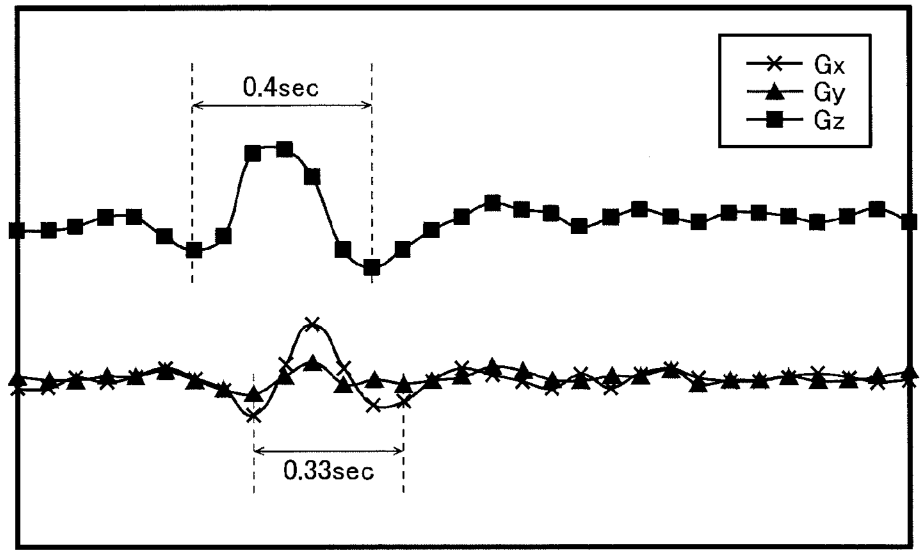
FIG. 13 is a time chart for illustrating a basis for setting a moving average period.

FIG. 13 is a time chart for illustrating a basis for setting a moving average period with a typical vehicle, and the figure shows, in the form of a time-series graph, data of acceleration in each of directions of three axes (the X, Y and Z axes) measured during a driving operation of the vehicle. As shown in the figure, acceleration change attributable to an uneven road surface shows a vibration-like behavior, and its cycle has been determined from the measurement data to be within the range substantially from 0.3 to 0.5 seconds regardless of the speed of the vehicle, the suspension performance of the vehicle, or the road surface condition. Thus, it is reasonable to think that the acceleration change attributable to an uneven road surface can be properly filtered out by setting a moving average period considering the above-mentioned cycle (ranging from 0.3 to 0.5 seconds).

Figure 14:
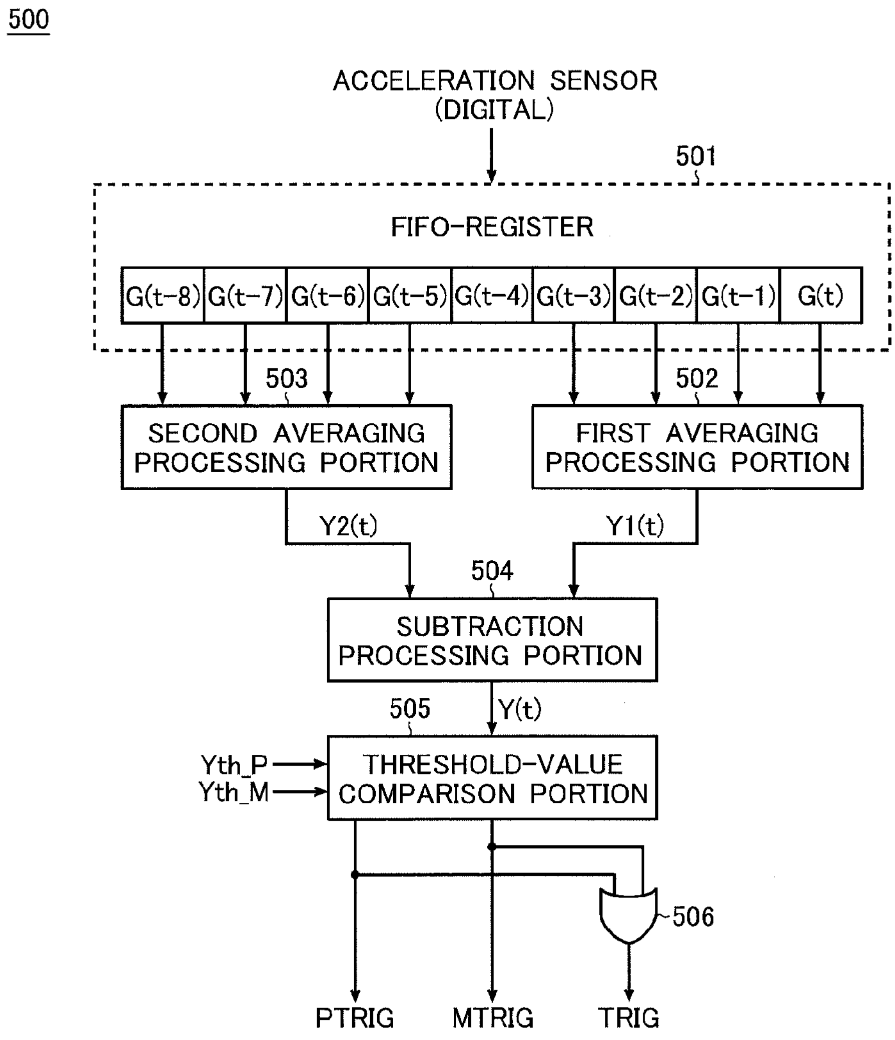
FIG. 14 is a block diagram showing an example of the structure of a trigger judgment circuit.

FIG. 14 is a block diagram showing an example of the structure of a trigger judgment circuit that realizes the above-discussed trigger judgment algorithm in a hardware manner. A trigger judgment circuit 500 of this structure includes an FIFO (first-in first-out) register 501, a first averaging processing portion 502, a second averaging processing portion 503, a subtraction processing portion 504, a threshold-value comparison portion 505, and a logical OR operation unit 506.

The FIFO register 501 sequentially stores thereinto digital acceleration data inputted from an acceleration sensor. For example, assuming that the sampling number (moving average periods) of the moving averaging processing is "five" and the sampling number of overlapping data (overlapping periods) is "one", nine samples of acceleration data G(t−8) to G(t) are stored into the FIFO register 501.

The first averaging processing portion 502 calculates a moving average Y1'(t), using four latest samples of acceleration data G(t−3) to G(t) among the nine samples of acceleration data stored in the FIFO register 501, by calculating the total sum of the samples (=G(t−3)+G(t−2)+G(t−1)+G(t)) and dividing the resulting total sum by the sampling number (=five) of the moving averaging processing.

The second averaging processing portion 503 calculates a moving average Y2'(t), using four oldest samples of acceleration data G(t−8) to G(t−5) among the nine samples of acceleration data stored in the FIFO register 501, by calculating the total sum of the samples (=G(t−8)+G(t−7)+G(t−6)+G(t−5)) and dividing the resulting total sum by the sampling number (=five) of the moving averaging processing.

Note that the first and second averaging processing portions 502 and 503 do not use the acceleration data G(t−4) of the overlapping period in calculating the moving averages Y1'(t) and Y2'(t). The reason for this is as follows: even if the acceleration data G(t−4) is used in calculating the above-mentioned moving averages Y1(t) and Y2(t), when the moving average differential value Y(t) is calculated by the subtraction processing portion 504 in the latter stage, the acceleration data G(t−4) in the overlapping period is cancelled by the subtraction processing, and thus it is advantageous to preliminarily exclude the acceleration data G(t−4) from the viewpoint of reducing the circuit scale.

The subtraction processing portion 504 calculates the moving average differential value Y(t) (=Y1'(t)−Y2'(t)) by subtracting the moving average Y2'(t) from the moving average Y1'(t).

The threshold-value comparison portion 505 generates a positive trigger signal PTRIG by comparing the moving average differential value Y(t) with a positive threshold value Yth_P, and generates a negative trigger signal MTIG by comparing the moving average differential value Y(t) with a negative threshold value Yth_M. If the moving average differential value Y(t) is higher than the positive threshold value Yth_P, the positive trigger signal PTRIG is considered to be high level and the negative trigger signal MTRIG is considered to be low level. If the moving average differential value Y(t) is lower than the positive threshold value Yth_P and higher than the negative threshold value Yth_M, the positive trigger signal PTRIG and the negative trigger signal MTRIG are both considered to be low level. If the moving average differential value Y(t) is lower than the negative threshold value Yth_M, the positive trigger signal PTRIG is considered to be low level and the negative trigger signal MTRIG is considered to be high level.

The logical OR operation unit 506 performs a logical OR operation of the positive trigger signal PTRIG and the negative trigger signal MTRIG, and thereby generates a trigger signal TRIG. Thus, the trigger signal TRIG is high level when at least one of the positive and negative trigger signals PTRIG and MTRIG is high level, and is low level only when both of the positive and negative trigger signals PTRIG and MTRIG are low level.

The trigger judgment circuit 500 of this example has a feature that the moving average differential value Y(t) is compared with two threshold values, namely, the positive and negative threshold values Yth_P and Yth_M, but this is not meant to limit the present invention, and as shown in FIG. 11D referred to above, the absolute moving average differential value |Y(t)| may be compared with one threshold value Yth. In that case, the subtraction processing portion 504 needs to be equipped with an absolute value calculation function, but on the other hand, the negative threshold value Yth_M and the logical OR operation unit 506 are unnecessary.

Figure 15:
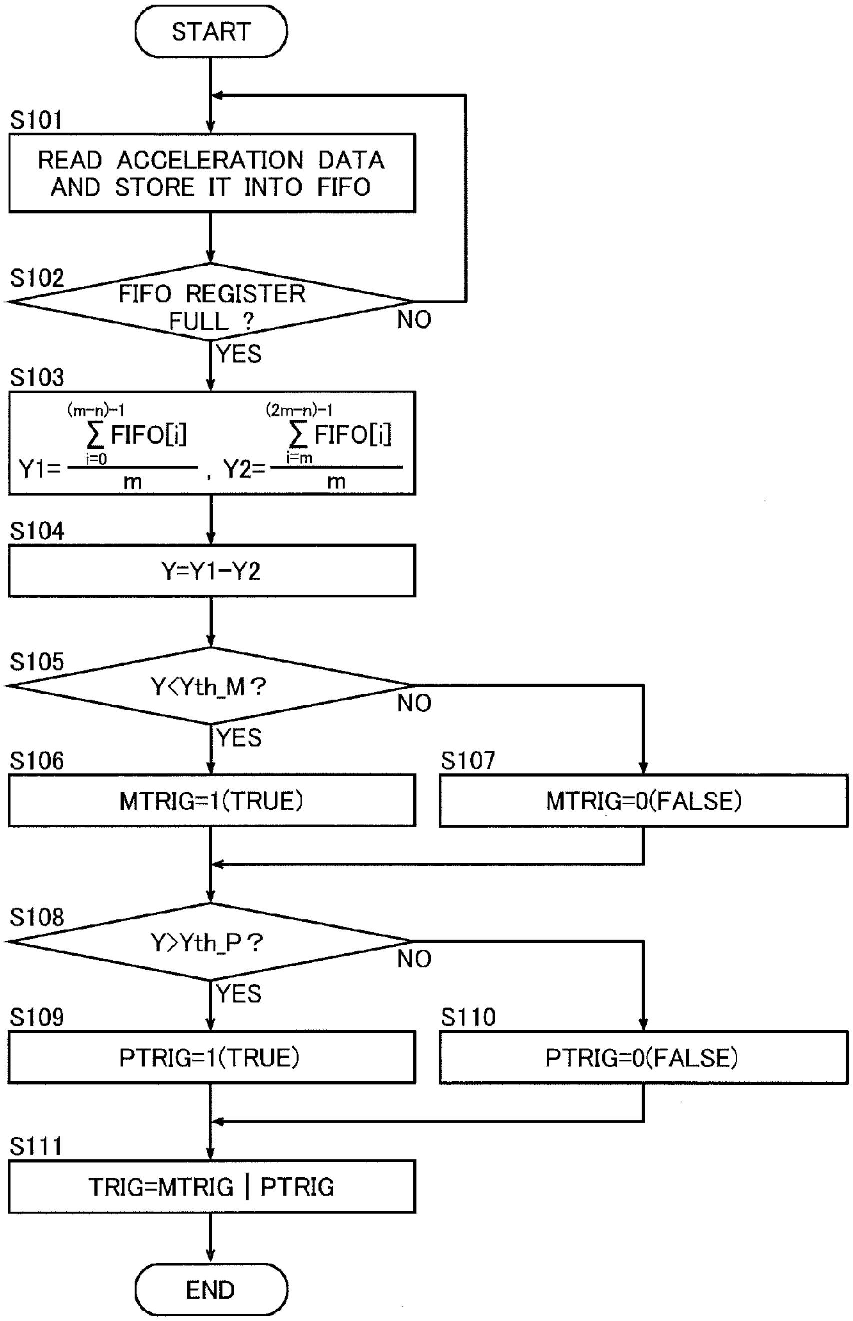
FIG. 15 is a flow chart for illustrating a trigger judgment operation.

FIG. 15 is a flow chart for illustrating a trigger judgment operation when the above-described trigger judgment algorithm is realized in a software manner by using, for example, a microcomputer. In the following description of this flow chart, it is assumed that the sampling number of the moving averaging processing (moving average periods) is "m" and the sampling number of the overlapping data (overlapping periods) is "n". Values stored in the FIFO register will be sequentially denoted by FIFO[0] to FIFO[(2m−n)−1], FIFO [0] denoting the latest one.

When the flow starts, in step S101, digital acceleration data inputted from an acceleration sensor is sequentially stored into the FIFO register, and in the next step S102, it is judged whether or not the FIFO register is filled up. Here, if it is judged that the FIFO register is not filled up, the flow returns to step S101, where the storing operation of the acceleration data is repeated.

If it is judged that the FIFO register is filled up (YES in step S102), then in step S103, processing of calculating moving averages Y1' and Y2' is performed. The moving average Y1' is acquired by dividing the total sum of the latest (m−n) samples of the acceleration data among the (2m−n) samples of the acceleration data stored in the FIFO register (=FIFO[(m−n)−1]+FIFO[(m−n)−2]+ . . . +FIFO[1]+FIFO[0]) by the sampling number (=m) of the moving averaging processing. The moving average Y2' is acquired by dividing the total sum of the oldest (m−n) samples of the acceleration data among the (2m−n) samples of the acceleration data stored in the FIFO register (=FIFO[(2m−n)−1]+FIFO[(2m−n)−2]+ . . . +FIFO [m+1]+FIFO[m]) by the sampling number (=m) of the moving averaging processing.

After the moving averages Y1' and Y2' are calculated in step S103, processing of calculating a moving average differential value Y (=Y1'−Y2') is performed in the next step S104, and then the flow proceeds to step S105.

In step S105, judgment is performed of whether or not the moving average differential value Y is lower than the negative threshold value Yth_M. Here, if the moving average differential value Y is judged to be lower than the negative threshold value Yth_M, then the negative trigger signal MTRIG is shifted to high level in step S106, and the flow proceeds to step S108. On the other hand, if the moving average differential value Y is judged not to be lower than the negative threshold value Yth_M, then the negative trigger signal MTRIG is shifted to low level in step S107, and the flow proceeds to step S108.

In step S108, judgment is performed of whether or not the moving average differential value Y is higher than the positive threshold value Yth_P. Here, if the moving average differential value Y is judged to be higher than the positive threshold value Yth_P, then the positive trigger signal PTRIG is shifted to high level in step S109, and the flow proceeds to step S111. On the other hand, if the moving average differential value Y is judged not to be higher than the positive threshold value Yth_P, then the positive trigger signal PTRIG is shifted to low level in step S110, and the flow proceeds to step S111.

In step S111, the trigger signal TRIG is generated through a logical OR operation of the positive and negative trigger signals PTRIG and MTRIG, and this completes the above-described series of processing.

In the flow chart of FIG. 15, as an example, a structure is illustrated in which the moving average differential value Y is compared with two threshold values, namely, the positive and negative threshold values Yth_P and Yth_M, but this is not meant to limit the present invention, and as shown in FIG. 11D referred to above, the absolute moving average differential value |Y(t)| may be compared with one threshold value Yth. In that case, an absolute value processing step needs to be performed after step S104, but steps S105 to S107 are unnecessary.

In a case in which the above-described trigger judgment operation is performed by using a microcomputer, there is preferably provided a trigger judgment program that is read and executed by a microcomputer to make the microcomputer function as the FIFO register 501, the first averaging processing portion 502, the second averaging processing portion 503, the subtraction processing portion 504, and the threshold-value comparison portion 505.

In the foregoing description of the embodiment, the trigger judgment algorithm according to the present invention has been described such that the calculation is performed with respect to acceleration data in the X-axis direction, but it goes without saying that the calculation may be performed with respect to acceleration data in the Y-axis direction or the Z-axis direction, and that the calculation may be performed with respect to acceleration data in any number of the X-axis, Y-axis, and Z-axis directions.

(Other Modified Examples)

It should be understood that, other than the embodiments described above, many modifications and variations are possible within the spirit of the present invention. All the illustrated embodiments disclosed herein should be considered as examples in all respects and not limitative. The scope of the invention is not limited to the above explanation, but should be understood to include all changes and modifications that fall within metes and bounds of the claims, or equivalence of such metes and bounds thereof are therefore intended to be embraced by the claims.

LIST OF REFERENCE NUMERALS

1 drive recorder
2 mobile telephone terminal
3 electric control unit (ECU)
4 in-vehicle sensor
5 mobile telephone line
6 server
7 line
8 traffic center server
9 police server
10 insurance company server
61 communication portion
62 information management portion
63 information analysis portion
64 information storage portion
101 control portion
102 imaging portion
103 GPS receiving portion
104 acceleration sensor
105 interface portion
106 real time clock (RTC)
107 storage portion
108 communication portion
109 operation portion
110 warning portion
200 image/audio processing LSI
201 camera (CAM)
202 real time clock (RTC)
203 EEPROM (E2P)
204 acceleration sensor (G sensor)
205 GPS module

206 speaker
207 microphone
208 audio codec
209 basic program storage memory
210 television monitor
211 SD card
212 extension program storage memory
213 optional camera
214 image processing IC
215 LrDA controller IC
216 IrDA module
220 step-down regulator (power supply IC)
221-223 diodes
224 resistor
225 secondary battery
230, 231, 232 step-down regulators (LDO)
300 control portion (CTRL)
400 bus interface circuit (bidirectional bus multiplexer)
401, 402 N-channel MOS field effect transistors
411-413 level shifters (VDD0/VDD1)
421-423 level shifters (VDD0/VDD1)
430 logical AND operation unit
I2C#1, I2C#2 two-line serial buses
R1, R2 resistors
V1 input voltage
V2 output voltage
V3 battery voltage
VDD0 internal voltage
VDD1 first interface voltage
VDD2 second interface voltage
500 trigger judgment circuit
501 FIFO register
502 first averaging processing portion
503 second averaging processing portion
504 subtraction processing portion
505 threshold-value comparison portion
506 logical OR operation unit

What is claimed is:

1. A drive recorder, comprising:

a trigger judgment circuit that calculates, with respect to acceleration data of a vehicle, first and second moving averages as moving averages of two different time series, and that generates a trigger signal according to a result of comparing a differential value or an absolute differential value of the first and second moving averages with a predetermined threshold value, wherein the first and second moving averages are values that are calculated with respect to acceleration data in two different time spans that are continuous and that partly overlap by overlapping acceleration data, the trigger judgment circuit includes:

a register that stores the acceleration data therein;

an averaging processing portion that calculates the first moving average, using m latest samples of acceleration data among n samples of acceleration data stored in the register, by calculating a total sum of the m latest samples of acceleration data and dividing the resulting total sum by a sampling number k of moving averaging processing, and the second moving average, using m oldest samples of acceleration data among the n samples of acceleration data stored in the register, by calculating a total sum of the m oldest samples of acceleration data and dividing the resulting total sum by the sampling number k of the moving averaging processing;

a subtraction processing portion that calculates the differential value or the absolute differential value of the first and second moving averages that are calculated by the averaging processing portion; and a threshold-value comparison portion that compares the differential value or the absolute differential value of the first and second moving averages that is calculated by the subtraction processing portion with the predetermined threshold value to thereby generate the trigger signal.

2. The drive recorder of claim 1, further comprising: a microcomputer that reads and executes a predetermined trigger judgment program to thereby function as the trigger judgment circuit.

3. The drive recorder of claim 1,wherein the overlapping acceleration data includes one to several samples of acceleration data.

4. The drive recorder of claim 1, wherein lengths of the time spans for calculating the first and second moving averages are each arbitrarily set.

5. The drive recorder of claim 1, wherein lengths of time spans for calculating the first and second moving averages are each 0.3 to 0.5 seconds.

6. The drive recorder of claim 1, further comprising: a control portion that decides, based on the trigger signal, whether or not to store driving condition data of a vehicle in a nonvolatile manner.

7. The drive recorder of claim 1, further comprising: a control portion that decides, based on the trigger signal, whether or not to alert a driver.

8. The drive recorder of claim 1, further comprising: a data collection portion that collects the driving condition data of a vehicle in a time series.

9. The drive recorder of claim 8, wherein the data collection portion includes: an imaging portion that shoots surroundings of a vehicle and generates image data.

10. The drive recorder of claim 8, wherein the data collection portion includes: a GPS receiving portion that uses a satellite signal from a GPS satellite to generate vehicle positional data.

11. The drive recorder of claim 8, wherein the data collection portion includes: an acceleration sensor that detects acceleration in each of three axial directions which are orthogonal to one another.

12. The drive recorder of claim 8, wherein the data collection portion includes: an interface portion that acquires operation condition data of each part of a vehicle inputted from an electric control unit mounted in a vehicle and various detection data inputted from an in-vehicle sensor.

13. The drive recorder of claim 8, wherein the data collection portion includes: a real time clock that generates time data indicating date and time.

14. The drive recorder of claim 8, further comprising: a storage portion that stores the driving condition data therein in a nonvolatile manner according to the trigger signal.

15. The drive recorder of claim 8, further comprising: a warning portion that gives a warning to a driver according to the trigger signal.

* * * * *